(12) United States Patent
Furuhashi et al.

(10) Patent No.: US 6,182,891 B1
(45) Date of Patent: Feb. 6, 2001

(54) ELECTRONIC BANKBOOK, AND PROCESSING SYSTEM FOR FINANCIAL TRANSACTION INFORMATION USING ELECTRONIC BANKBOOK

(75) Inventors: Nobuo Furuhashi; Kenichiro Inoue; Tomoo Takeda; Sigefumi Takahashi; Atsumi Tokumasu; Takafumi Kobayashi; Noriyuki Iwase, all of Tokyo (JP)

(73) Assignee: NTT Data Communications Systems Corporation, Tokyo (JP)

(*) Notice: Under 35 U.S.C. 154(b), the term of this patent shall be extended for 0 days.

(21) Appl. No.: 09/370,715

(22) Filed: Aug. 9, 1999

Related U.S. Application Data

(62) Division of application No. 08/617,832, filed as application No. PCT/JP95/01427 on Jul. 18, 1995, now Pat. No. 6,029,887.

(30) Foreign Application Priority Data

| Jul. 18, 1994 | (JP) | 6-165667 |
| Jan. 11, 1995 | (JP) | 7-18715 |
| Jan. 20, 1995 | (JP) | 7-26212 |

(51) Int. Cl.$^7$ ........................................ G06F 17/60
(52) U.S. Cl. ........................................ 235/379; 235/380
(58) Field of Search ........................ 235/375, 380, 235/379; 902/40; 705/35

(56) References Cited

U.S. PATENT DOCUMENTS

| 4,825,052 | 4/1989 | Chemin et al. . |
| 4,839,504 | * 6/1989 | Nakano ................................. 235/379 |
| 5,221,838 | * 6/1993 | Gutman et al. ....................... 235/379 |
| 5,577,121 | * 11/1996 | Davis et al. ........................... 380/24 |

FOREIGN PATENT DOCUMENTS 61-211791 * 9/1986 (JP) .

* cited by examiner

*Primary Examiner*—Karl D. Frech
(74) *Attorney, Agent, or Firm*—Koda & Androlia

(57) ABSTRACT

The object of the present invention is to propose an account bankbook, a money transfer card, a receipt file, and a checkbook utilizing an optical card, an IC card, or a hybrid optical/IC card. On the surface of a resin card base board 1 are formed an IC chip 11, an optical recording sheet 13, a magnetic stripe 14, and an embossment 12. In a semiconductor memory within the IC chip 11 are written validation keys, search keys, payee information, the upper limit amount of a check, and a program for processing transaction data. Access restrictions corresponding to various applications are imposed upon these data. The history of various cash transactions is recorded in the optical recording sheet 13. These records are of write-once type and rewriting or deletion thereof is impossible.

5 Claims, 29 Drawing Sheets

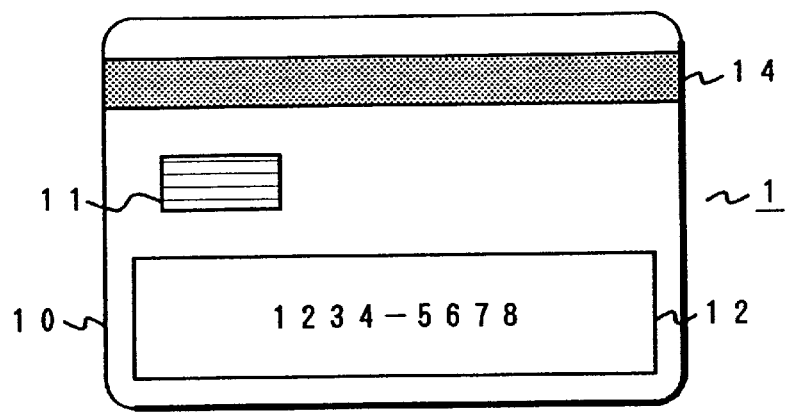
F I G. 1(a)
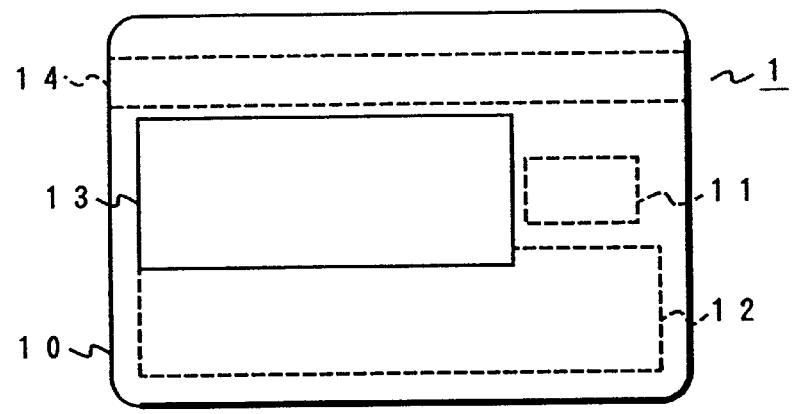
F I G. 1(b)
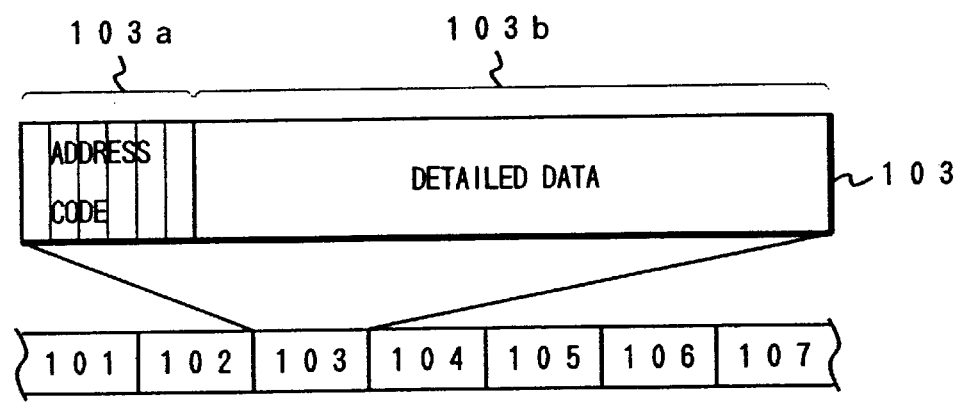
F I G. 1(c)

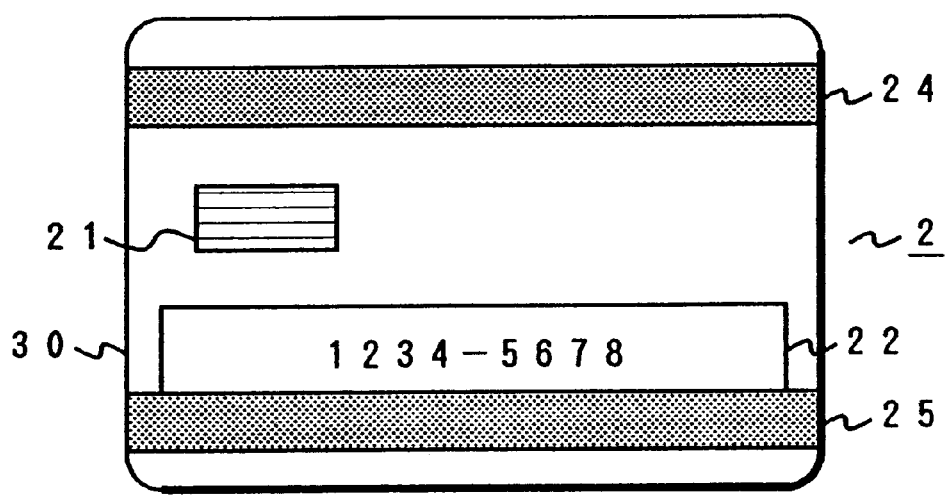
F I G. 3(a)
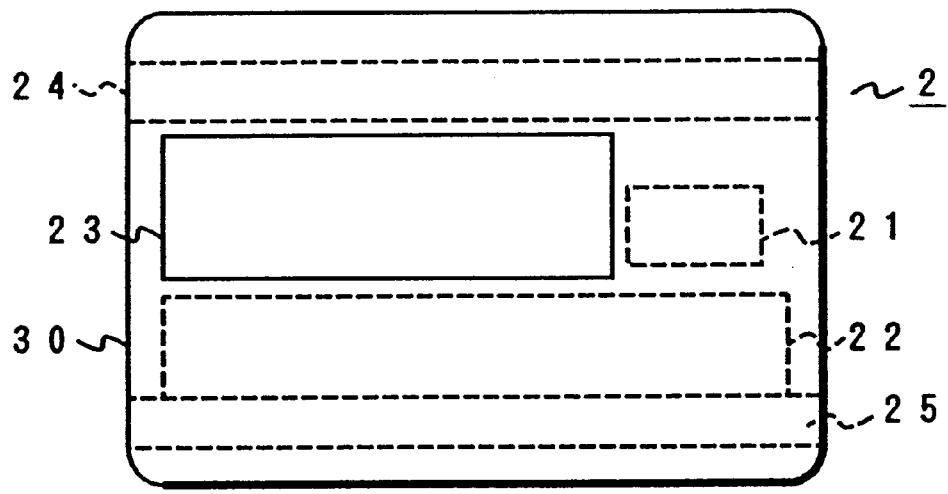
F I G. 3(b)

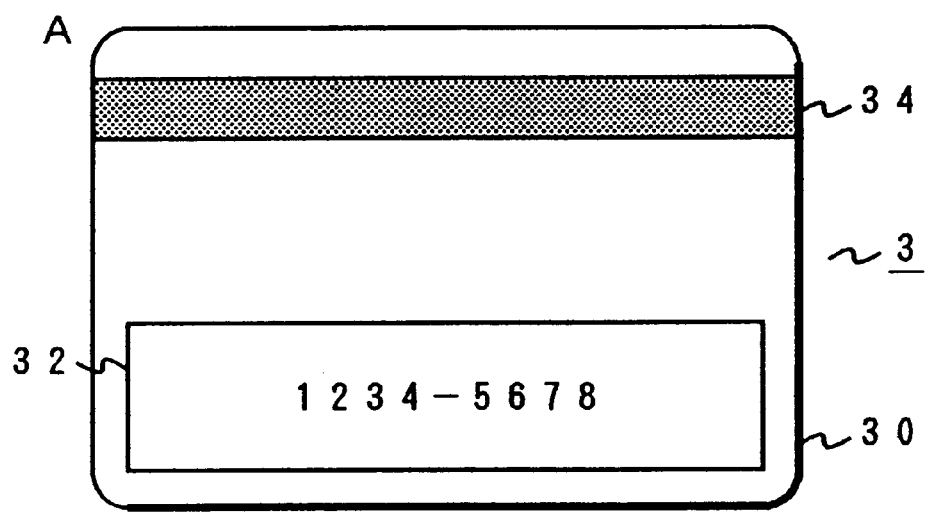
F I G. 4(a)
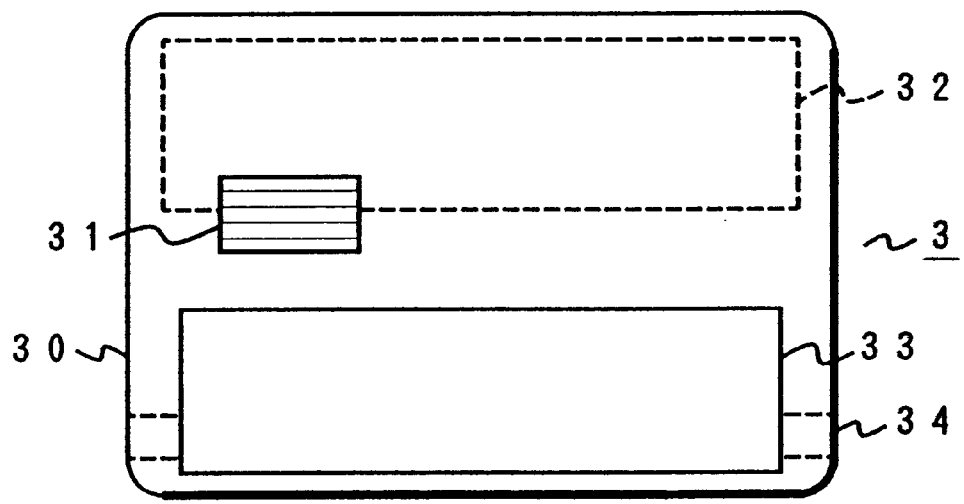
F I G. 4(b)

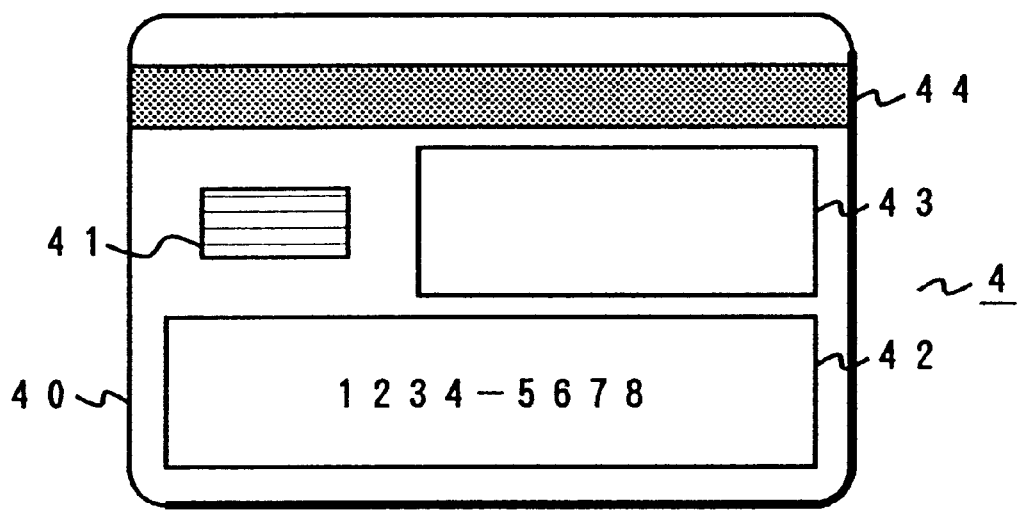
F I G. 5(a)
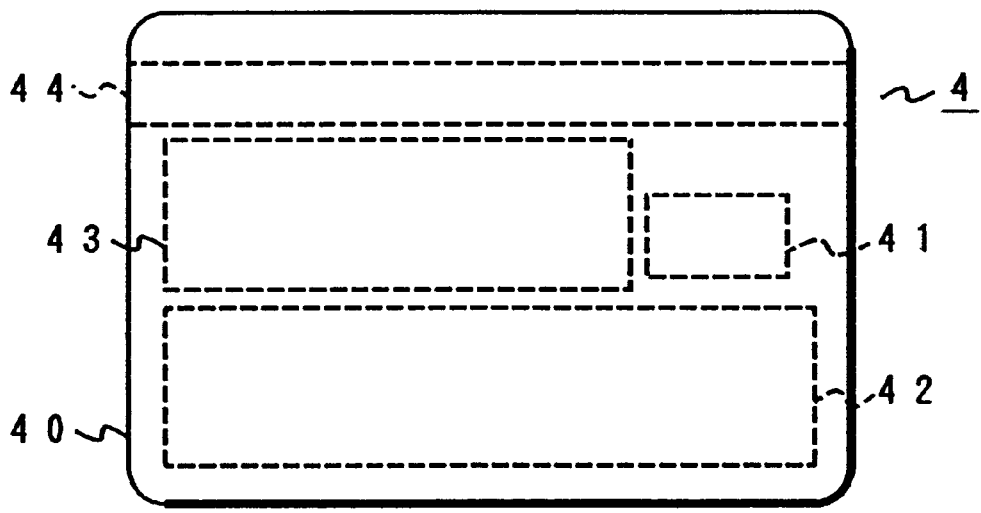
F I G. 5(b)

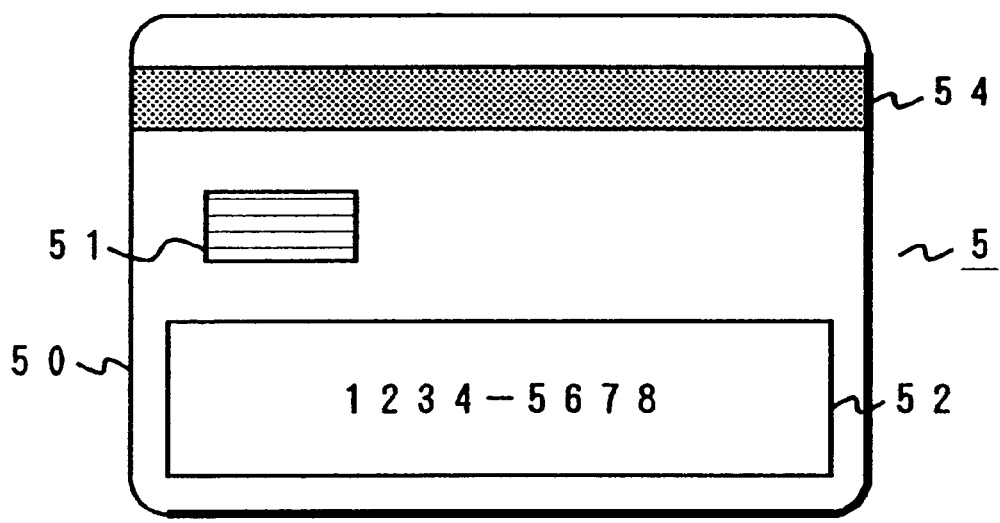
F I G. 6(a)
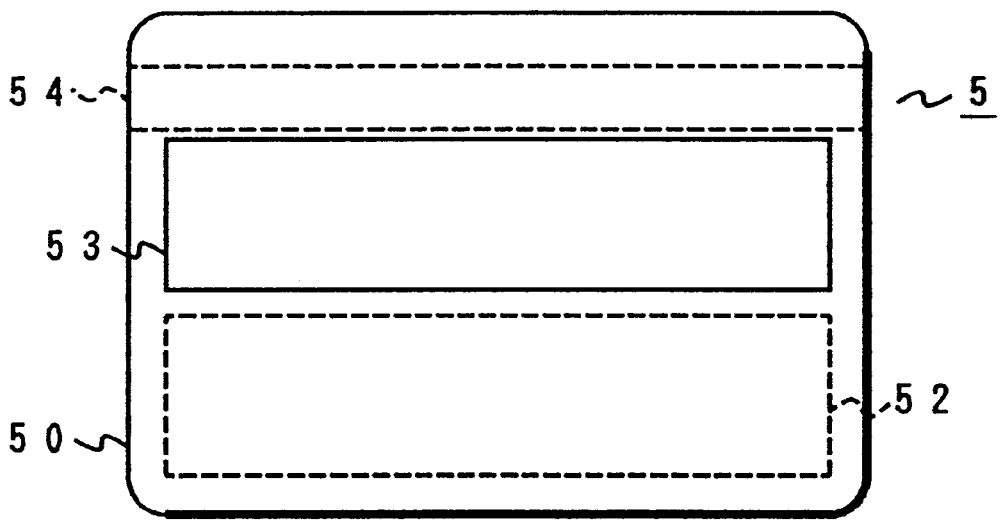
F I G. 6(b)

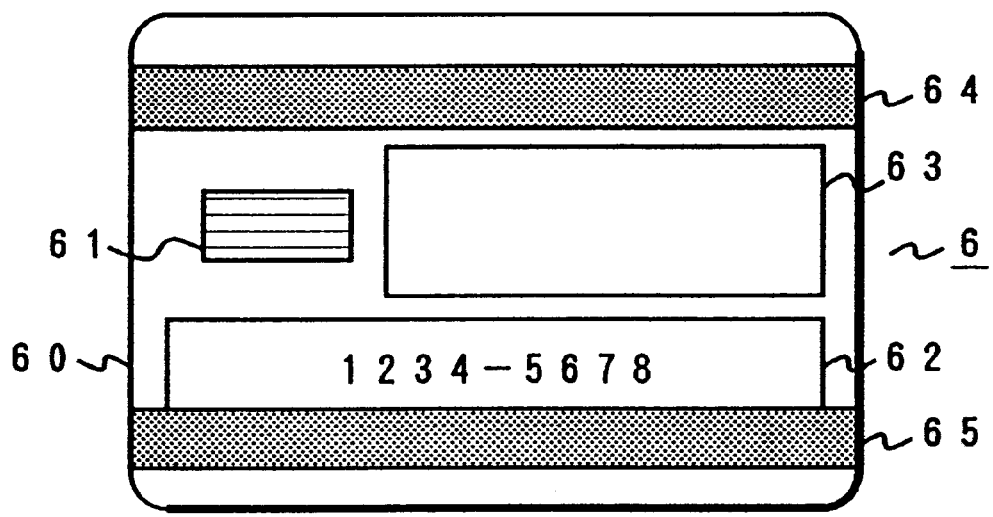
F I G. 7(a)
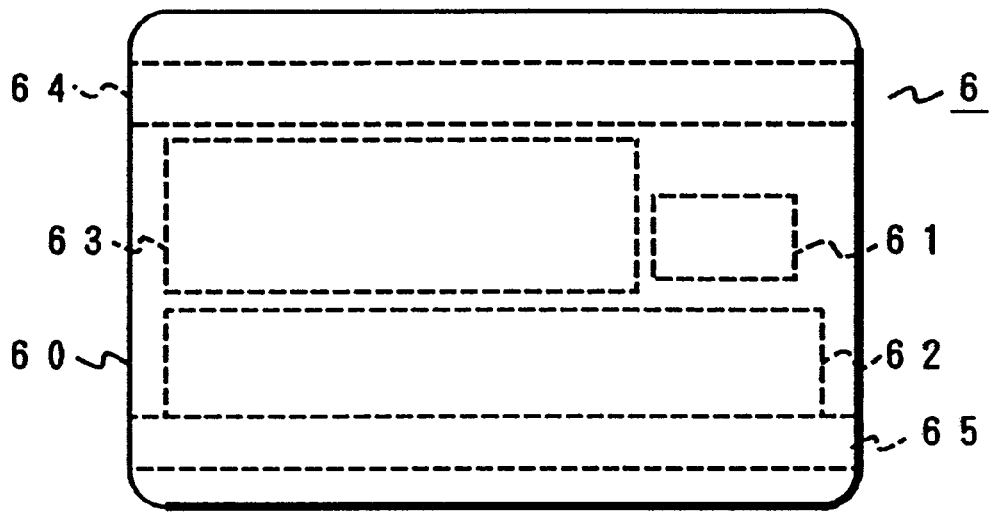
F I G. 7(b)

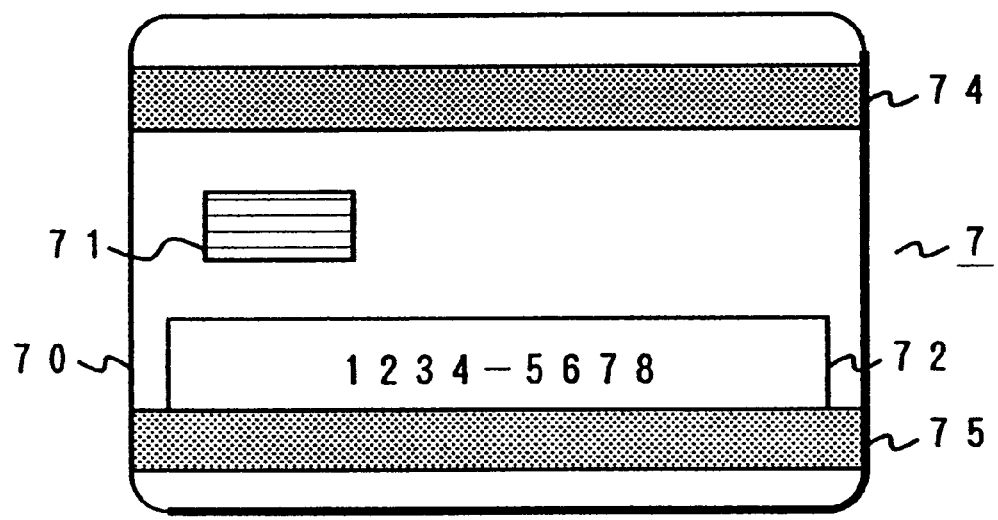
F I G. 8(a)
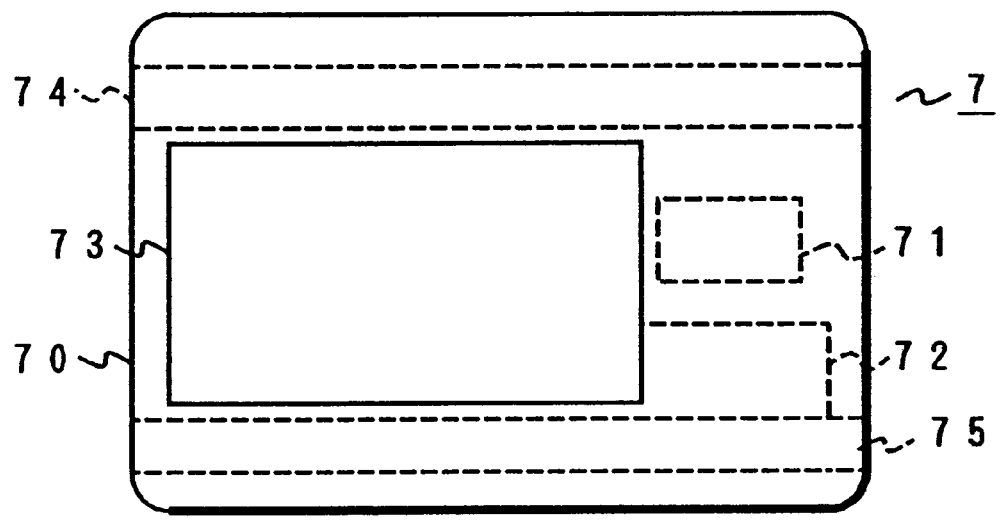
F I G. 8(b)

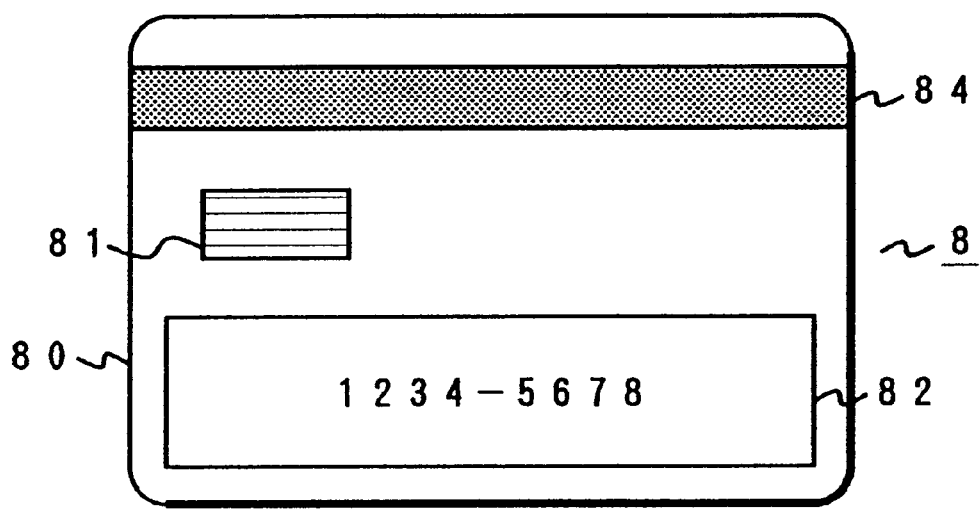
F I G. 9(a)
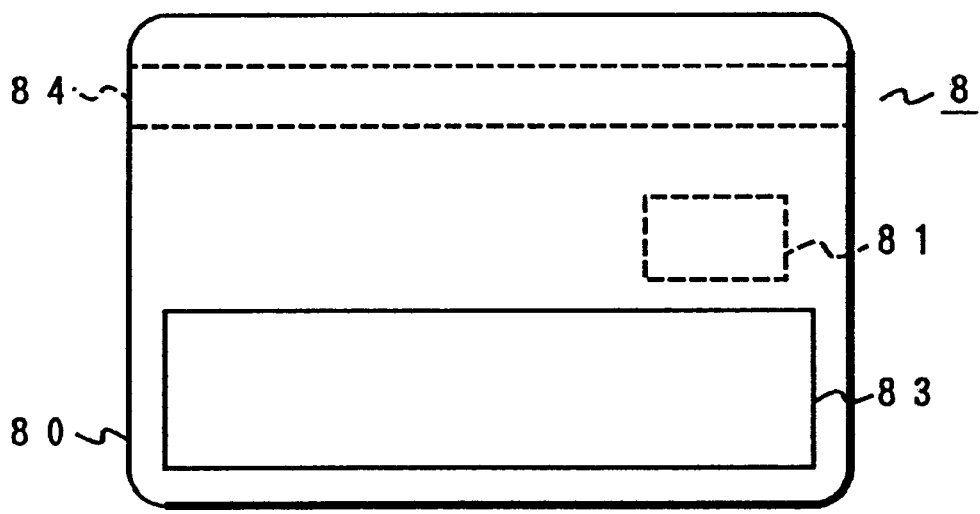
F I G. 9(b)

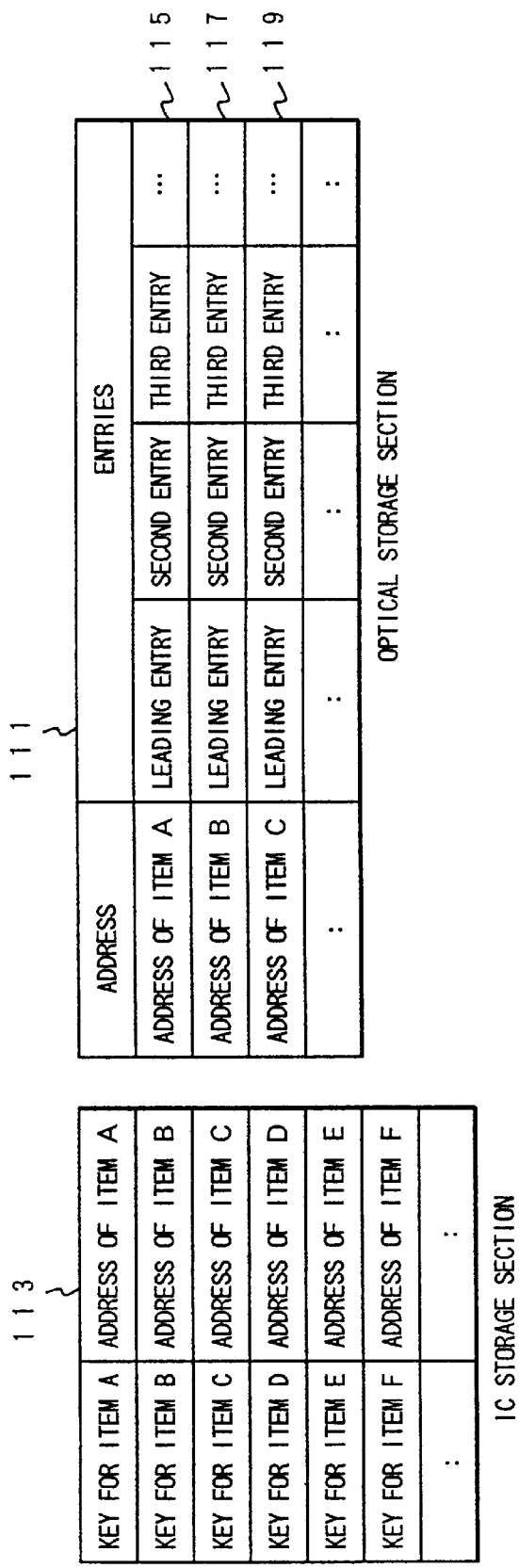
F I G. 10

| | BANK CODE 125 | BRANCH CODE 127 | ACCOUNT NUMBER 129 | ERROR CORRECTION CODE 121 |
|---|---|---|---|---|
| LEADING ENTRY → | ××× | ××× | ×××××××× | ×××× |
| SECOND ENTRY → | ××× | ××× | ×××××××× | ×××× |
| THIRD ENTRY → | ××× | ××× | ×××××××× | ×××× |
| ⋮ | ⋮ | ⋮ | ⋮ | ⋮ |
F I G. 12
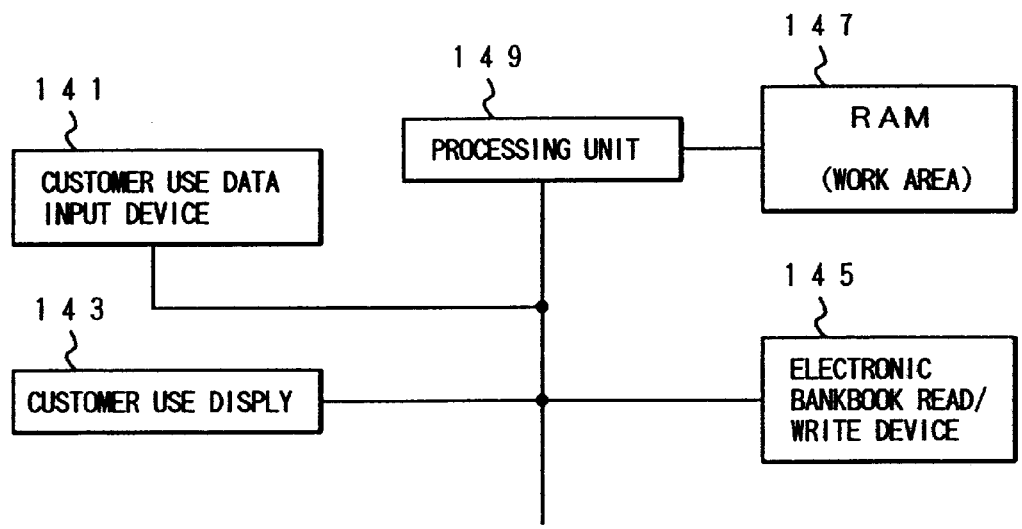
F I G. 13

| DATE | TIME | BANK CODE | BRANCH CODE | CLASSIFICATION CODE | SERVICE TYPE | AUTOMATIC PAYMENT TYPE | HANDLED AMOUNT | BALANCE AMOUNT | ERROR CORRECTION CODE |
|---|---|---|---|---|---|---|---|---|---|
| YYMMDD | HHMMSS | xxx | xxx | xx | xx | xx | xxxxxxxxxxxxxxx | xxxxxxxxxxxxxxx | xxxx |
| YYMMDD | HHMMSS | xxx | xxx | xx | xx | xx | xxxxxxxxxxxxxxx | xxxxxxxxxxxxxxx | xxxx |
| YYMMDD | HHMMSS | xxx | xxx | xx | xx | xx | xxxxxxxxxxxxxxx | xxxxxxxxxxxxxxx | xxxx |
| .. | .. | .. | .. | .. | .. | .. | .. | .. | .. |

FIG. 15

```
CODE    SERVICE TYPE              CODE    AUTOMATIC PAYMENT TYPE
---------------------------       --------------------------------
0 0  : DEPOSIT                    A : ELECTRICITY BILL
0 1  : SALARY/BONUS               B : WATER BILL
0 2  : PAYMENT                    C : GAS BILL
0 3  : WITHDRAWAL                 D : TELEPHONE BILL
0 4  : AUTOMATIC PAYMENT          E : N H K BILL
0 5  : CARD FEE                   F : CREDIT COMPANY BILL
                                  G : BANK POS BILL
```

| PRINT | | | | |
|---|---|---|---|---|
| | *FEE DETAILS | | POINT : N N N POINT | |
| Y-M-D | EXPLANATION | FEE AMOUNT | BALANCE | |
| 99-99-99 | CARD/BANCS  NTT BANK | 103 | 23,000 | |

FEE TOTAL  ¥zz,zz,zz9

END

FIG. 21

```
                                                              6. 3.20 12:15
NORMAL ACCOUNT    ACCOUNT NUMBER 1234567                 POINT : 9 POINTS
                              FEE

Y-M-D  [      CUSTOMER MEMO      ] AMOUNT PAID 6- 1-14 [ BANCS FUJI BANK              ]      103
           6- 1-16 [ AFTER HOURS                  ]      103
           6- 1-20 [ AFTER HOURS                  ]      103
           6- 2- 2 [ BANCS DAI ICHI KANGYOO BANK  ]      103
           6- 2-22 [ AFTER HOURS                  ]      103
           6- 3- 4 [ MICS YOKOHAMA BANK           ]      103
           6- 3-15 [ AFTER HOURS                  ]      103

AFTER HOURS SUB TOTAL         309
                          OTHER BANKS NETWORK SUB TOTAL 412
                          TOTAL AMOUNT                  721
```

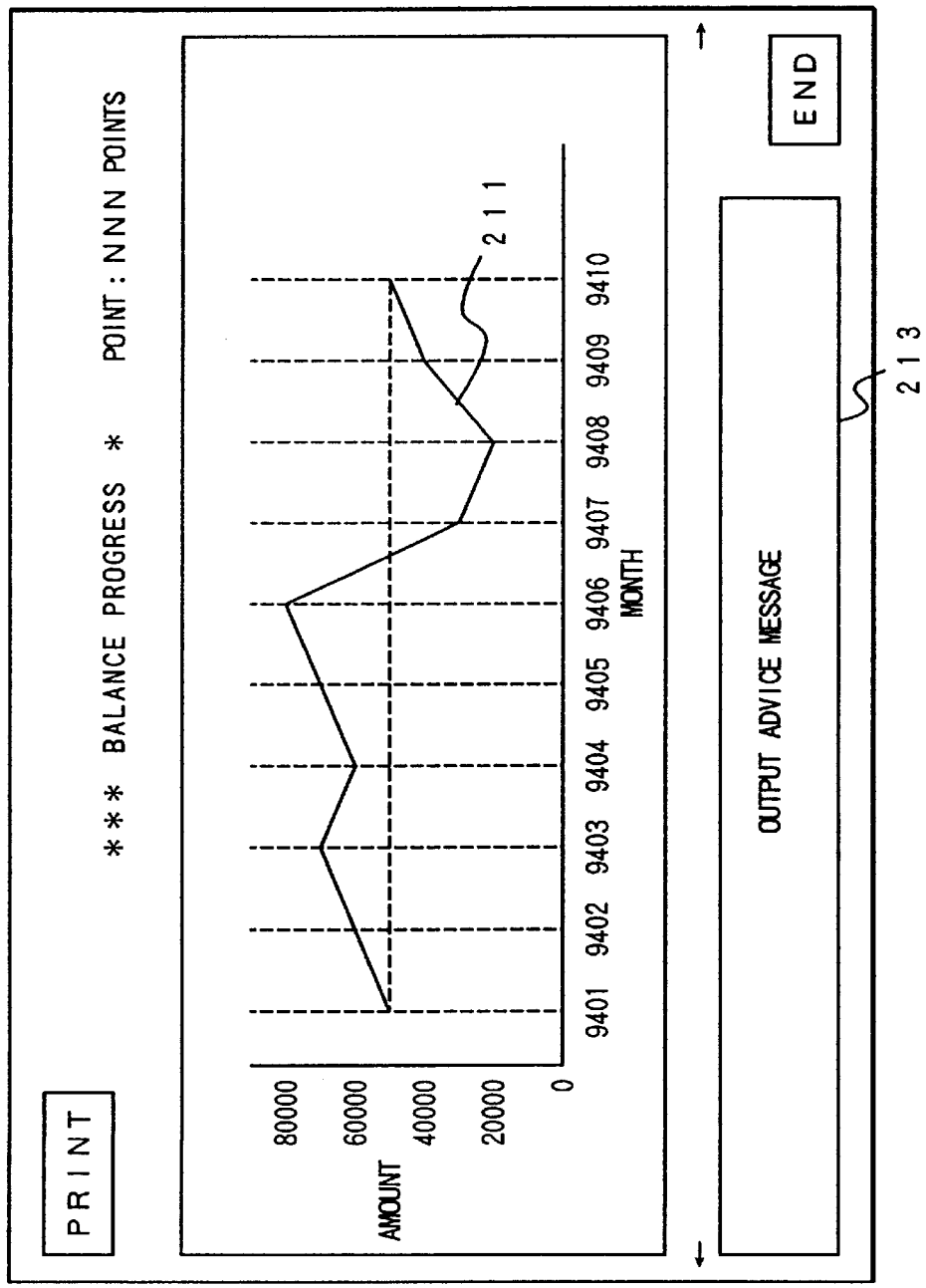
F I G. 23

| NAME OF SHOP ISSUING RECEIPT | SHOP ADDRESS | SHOP TELEPHONE NUMBER | AMOUNT PAID | DATE/ TIME OF PAYMENT | REASON FOR PAYMENT | SHOP ID | SHOP VALIDATION CODE | CHECK CODE |
|---|---|---|---|---|---|---|---|---|

FIG. 25

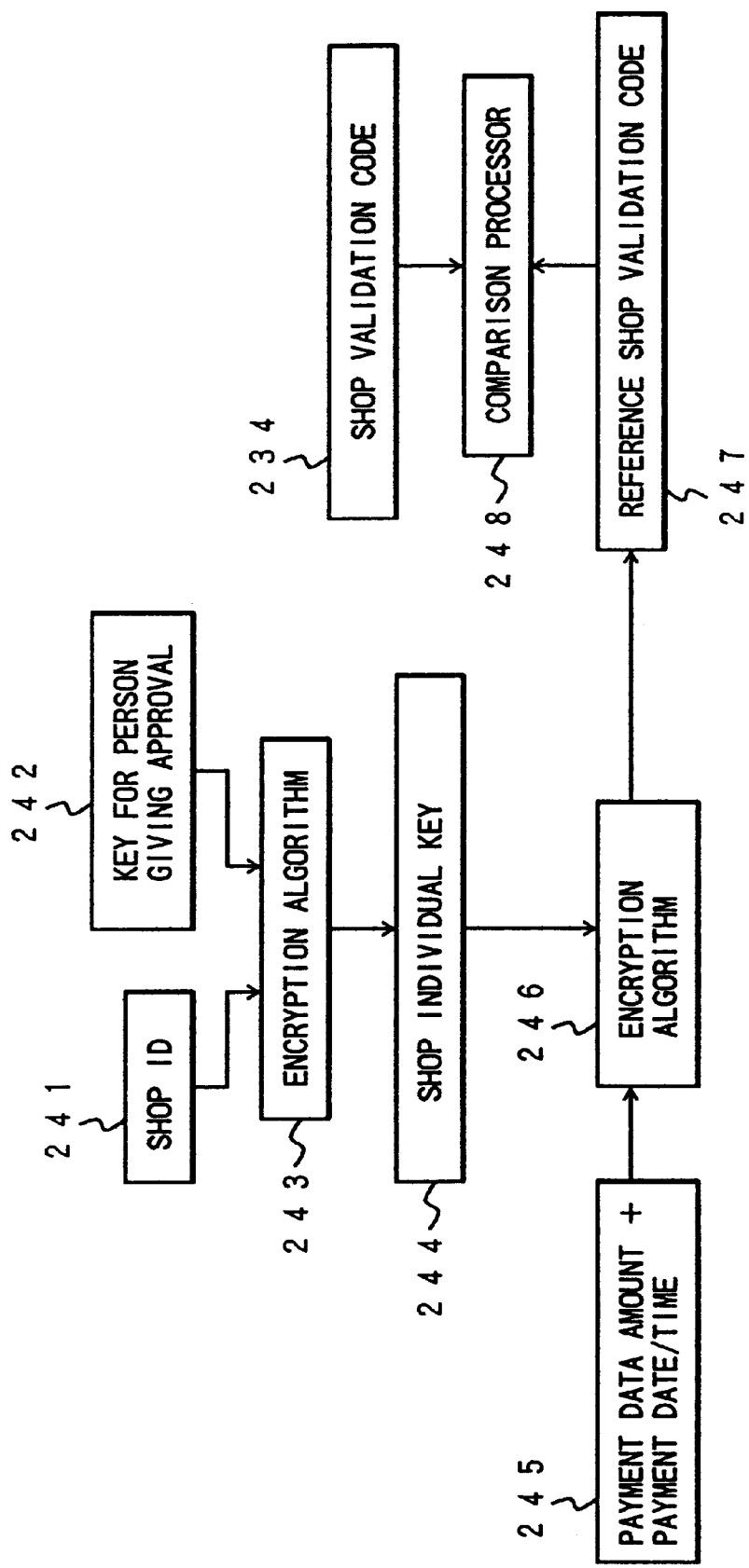
F I G. 27

ELECTRONIC BANKBOOK, AND PROCESSING SYSTEM FOR FINANCIAL TRANSACTION INFORMATION USING ELECTRONIC BANKBOOK

This is a Divisional application of application Ser. No. 08/617,832, U.S. Pat. No. 6,029,887 filed Mar. 18, 1996 which is a 371 of PCT/JP95/01427, filed Jul. 18, 1995.

1. FIELD OF THE INVENTION

The present invention relates to an electronic bankbook which combines on the same resin base board an IC card, an optical storage medium, and a magnetic stripe and embossing, and which has the functions of a money transfer card, a cash card, and a deposit account bankbook; and which further provides added value by combining these functions. And, in addition, the present invention also relates to a system which processes financial transaction information using an electronic bankbook.

2. BACKGROUND OF THE INVENTION

The computerization of financial work has progressed in recent years, and the demand is increasing for conversion from the paper bankbooks which are used in banks to electronic cards. IC cards and optical cards are proposed as cards which can correspond to these sorts of demands. IC cards, as is known, are ones in which IC chips including semiconductor memory are arranged in predetermined regions upon a card base board made of resin, and they combine both high security characteristics and also potential capacity several times or more that of magnetic stripes; and, on the other hand, optical cards are ones in which an optical storage medium is disposed in stripe form or rectangular form upon a card base board made of resin, and, while they have low security characteristics, the feature is outstanding that they can ensure storage capacities in units of megabytes. Furthermore, recently, various proposals have been made for hybrid type cards in which IC chips and an optical storage medium are disposed in combination on the same card base board, in order to make the most of the beneficial features of them both more efficiently.

In the conversion from paper bankbooks to electronic cards, not only high security characteristics, but also the absolute accuracy of the recorded detailed bankbook information which includes a history of transactions must be ensured. That is to say, because the customer cannot in any way tamper with the detailed bankbook information once it has been recorded, a paper bankbook functions as a certificate which is objective evidence of the transaction history of cash depositing and payment and the like; and, furthermore, as an original, it also functions as a security for evidence ability. Accordingly, it is necessary for these functions also to be supported by a electronic card, and there should be no possibility of rewriting the detailed bankbook information which has been stored on the various storage mediums. Accordingly, it is necessary for the recording medium upon the card base plate which is to be used as an electronic bankbook to be of a non rewritable category, such as an optical storage medium of the write-once type.

From a different angle, it often happens recently that the same person carries a plurality of cash cards and/or money transfer cards. Further, the number of paper bankbooks and the number of transaction slips on which detailed bankbook information is printed increase along with the increase of card transactions. However, since a considerable cost is entailed when producing these cards, paper bankbooks, and transaction slips, the burden of expense to the banks is immense. On the other hand, for the customers as well, carrying a plurality of cards, paper bankbooks, and the like becomes inconvenient from the management point of view. Accordingly, it would be convenient from the point of view of the bank and also from the point of view of the customer if it were possible to combine into one card the functions of this plurality of cards and paper bankbooks, but in the prior art nothing has existed which has combined the functions of such a plurality of cards, due to the above described restrictions related to the storage medium and also due to the diversity of detailed bankbook information and the increasing amount thereof and the like. As described above, in the conversion from paper bankbooks to electronic cards, the implementation of the combination together of the functions of several cards has been extremely difficult, even independently of the fact that the demands of society are high, due to the existence of problems such as those described below, mainly in the way in which the detailed bankbook information should be recorded upon the cards.

(1) With IC cards, the above described stable security characteristic can be planned for, and moreover they have the beneficial feature that since the storage regions are constituted by semiconductor memory the recording and the reading out of information can be performed at high speed; but the down side is that the recording capacity of low cost cards is insufficient even for just simply recording the detailed bankbook information, and high capacity cards have the defect that the production cost becomes high. As described above, when considering the point that it should be impossible to tamper with the detailed bankbook information (which must not be done) and also the point that it is necessary to issue bankbooks in large amounts, the cost rapidly becomes high when using IC cards as electronic bankbooks, and cannot be said to be practicable.

(2) Further, with optical storage mediums, although it is possible to obtain high capacity ones at comparatively low cost, it is normal to perform the management of the recorded information based upon management information within the optical storage medium, without distinction of rewritable type and write-once type.

Due to this, if the quantity of the detailed bankbook information which is recorded is great, a long time period is required for referring thereto. Further, with the write-once type, there is the problem that recording capacity is expended uselessly when correcting the addresses or the like which serve as the keys for searching.

(3) Magnetic stripes are cheap in cost in correspondence with their low recording capacity, but are limited in their application to use for specified transactions, and by themselves are not suitable for service as electronic bankbooks.

(4) At least at the present moment, for cash cards and the like, proud-indented portions (embossing) are essential for displaying specific letters, digits, and symbols for personalization of these cards. However, the positions for the regions for formation (engraving) of this embossing are limited to specific regions of the card, and moreover they occupy wide areas. For this reason, it has not been possible to combine a plurality of storage mediums upon the same card base board with currently existing card layouts. In particular, with optical cards which have an optical storage medium, even forming this embossing has been an impossibility.

3. OBJECTS OF THE INVENTION

An object of the present invention is to resolve these problems, and to provide an electronic bankbook which combines several functions upon one card.

Another object of the present invention is to provide novel techniques for performing the management of financial transactions in convenient terms from the point of view of the customer, using an electronic bankbook.

A further object of the present invention is to provide techniques for utilizing an electronic bankbook as a tool for various aspects of the financial activities of the customer.

4. SUMMARY OF THE INVENTION

4.1 The Basic Construction of the Electronic Bankbook

The present invention provides an electronic bankbook comprising; a rewritable storage medium, for example a semiconductor memory upon an IC chip; a unrewritable storage medium, for example a write-once type optical storage medium; and at least one magnetic stripe which are disposed in predetermined regions of the same card base plate. In the rewritable storage medium, there is provided a search information recording region for storing payee information and search key information. In the unrewritable storage medium, there is provided a region for storing detailed bankbook information whose storage address is specified by the search key information. Further, in the magnetic stripe there is provided a region for storing bankbook information including a security code, a bank code, and for each type handled a bank account number and the like.

The present invention also provides an electronic bankbook of another construction comprising; a proud-indented type embossing being formed upon a predetermined region of the card base board; and the rewritable and unrewritable storage mediums and the magnetic stripe being disposed in regions which avoid the embossments on the card base board.

The present invention further provides an electronic bankbook of yet another construction comprising; a proud type embossing being formed upon predetermined region of the card base board; and the rewritable and unrewritable storage mediums disposed in regions which do not come into contact with a reading and writing device for the magnetic stripe.

With these electronic bankbooks of this invention, the search information recording region is provided in the rewritable storage medium, and the payee information and the search key information are stored in this region. The payee information contains bank account numbers and account names, and so on of payees, and, since these data are freely rewritable according to requirements, the same functions are realized as with a prior art money transfer card.

The search key information is a directory of the detailed bankbook information which is the object of search, and indicates for example the deposit or withdrawal type and the transaction type and the like for each of the transaction records. Since this search key information is also rewritable according to requirements, it is possible to record various suitable extra items of information.

Further, the region for storing the detailed bankbook information is provided in the unrewritable storage medium which is disposed upon the same card, and the storage address of this region is specified according to the above described search key information. Since this storage region cannot be rewritten, it never happens that detailed bankbook information which has once been stored is ever falsified, and the transaction history of the customer becomes an objective entity. Accordingly, it is possible to guarantee functioning as a certificate basically identical to that of a paper bankbook. Further, even if a large quantity of detailed bankbook information is stored upon this unrewritable recording region, since their storage addresses are specified by the data in the rewritable recording region, searching for the whereabouts of the various items of detailed bankbook information becomes extremely easy.

In particular, when the rewritable storage medium (or the rewritable recording region) is constituted by a semiconductor memory in an IC chip, the storage and replaying of the detailed bankbook information can be performed at high speed, and further it is possible to encryption and to impart a validation code during storage, so that the security characteristic is elevated. In addition, when the unrewritable storage medium (or the unrewritable storage region) is constituted by a write-once type optical storage medium, it becomes possible to put together the high speed accessibility and the high security characteristic of the semiconductor memory and the high storage capacity of the optical storage medium, so that it is possible to cause the latter to operate as extended memory for the former.

Furthermore, the magnetic stripe is provided on this card, and the magnetic stripe has a storage region for bankbook information such as a security code, a bank code, and a bank account number for each of handled items and the like. Therefore, in addition to functions identical to those of a paper bankbook, this card also offers functions as a cash card and/or a card for card loans. Since also in the case of use for this sort of application the transaction history is stored as detailed bankbook information in the unrewritable storage region via the rewritable storage region, thereby it is possible to count upon so called apportionment of function.

Moreover, in the case that the proud-indented type embossing is formed upon the predetermined region of the card, the rewritable and unrewritable storage mediums and the magnetic stripe are disposed in the regions which avoid the appropriate embossments of the card, and in the case that the proud type embossing is formed, the rewritable and unrewritable storage mediums are disposed in the regions which do not come into contact with a reading and writing device for the magnetic stripe. Therefore, without receiving influence from the reading and writing device for each of the storage mediums, reading out of the inscribed information of the embossing can be performed in the manner of the prior art.

4.2 Improvements for Making Money Transfer Procedures More Convenient

The electronic bankbook according to the present invention which has been improved with regard to money transfers comprises a payee information storage section for storing one or a plurality of items of payee information determined by a customer at his option, which is capable of being read out by an ATM, and this payee information storage section is provided separately from a transaction data storage section for storing transaction data.

Here, "ATM" is an abbreviation for an "automatic teller machine", and is used in this specification also to include a dedicated machine for money transfer.

Further, a system for money transfer processing according to the present invention uses the above described improved electronic bankbook and the ATM, and this ATM comprises; a device for reading out the payee information registered in advance from the payee information storage section of the electronic bankbook; a selection device for selecting the payee items intended by a customer from among the payee information which is registered; and a device for executing money transfer processing using the payee items which has been read out by the reading out device and selected by the selection device.

This money transfer processing system may further comprise a payee entry device separate from the ATM, for writing one or a plurality of payee items determined by the customer into the payee information storage section of the electronic bankbook. In a preferred embodiment, this payee entry device is a personal computer or an electronic notebook, which is for the sole use of the customer.

A payee entry device for use with an electronic bankbook according to the present invention is constituted as a device separate from an ATM, and this entry device comprises; an electronic bankbook read/write device for reading and writing information in the electronic bankbook; a customer input device for inputting a payee items determined by the customer; and a control device for controlling the electronic bankbook read/write device so as to write the input payee items into the payee information storage section of the electronic bankbook.

A method for payee entry for an electronic bankbook according to the present invention uses the payee input device which is provided as a separate unit from an ATM, and this method comprises the steps of; setting the electronic bankbook to be accessible in the entry device; inputting a payee items determined by the customer using the entry device; and writing the payee items input from the payee entry device into the payee information storage section in the electronic bankbook.

With the electronic bankbook improved as described above according to the present invention, it is possible to register the payee information in the area separate from the transaction data storage section in advance. The payee items to be registered is not limited to the contents of the past transaction data which has been stored in the transaction data storage section, but can be determined by the free will of the customer. Accordingly, it is also possible to register data for future payees to whom money has not been transferred as yet. Further, since the payee information storage section is separate from the transaction data storage section which records transaction data, no influence is exerted upon bank transactions or the like even when performing the entry of payee information.

When performing a money transfer from an ATM using this electronic bankbook, according to the money transfer system of the present invention, since the ATM automatically reads out the payee information which is recorded in the electronic bankbook, if the customer performs only the selection of the intended payee items using the ATM, then the ATM executes money transfer processing using this selected payee items. Accordingly the trouble of inputting the payee items into the ATM is eliminated, and also there are almost no input errors.

According to the payee entry device and method according to the present invention, using an entry device which is separate from the ATM, it is possible to register payee items in the electronic bankbook in advance at a time which is convenient. Accordingly, it is not necessary to perform troublesome input operation in front of the ATM. In particular, with the preferred embodiment, since the entry device is a device for the personal use of the customer, the customer can enter the payee items even without attending the financial institution and moreover not necessarily during the working hours of the financial institution, at a tine and place which are convenient. Further, since this entry device performs writing only into the payee information storage section of the electronic notebook and does not perform writing into other transaction data storage sections or the like, it never happens that hindrance is caused to bank transactions or the like.

Further, for this entry device, a numeric key pad will be sufficient to serve as input keys to achieve the objective of inputting payee items, and it is not necessary for it to have any touch panel like an ATM. Further, since this entry device does not perform writing into any regions of the transaction data storage section of the electronic bankbook which may exert any influence upon bank transactions, it can exist independently without any link with the host computer of the financial institution, and it is not necessary to connect it using a signal circuit with the host computer, of the financial institution, like an ATM. Accordingly, it is possible to propose this entry device as a device for the personal use of the customer, and further it also is possible to make it sufficiently compact for it to be portable; thus, for example, it is possible to realize this entry device so as to be generally serviceable, by taking advantage of a device to the use of which the customer is accustomed such as a personal computer or an electronic notebook. Due to this, it is possible to so arrange matters that it is possible to use the entry device at a time and place which suit the convenience of the customer without his being limited to the working place or hours of the financial institution, and from the point of view of the customer this is extremely convenient.

4.3 Improvements for Making Reference Procedures for Recordings in the Electronic Bankbook More Convenient A transaction information processing device according to the present invention comprises; a type selection device for selecting one or more transaction types which are desired by a customer; a history querying device, responsive to codes of the transaction types in the electronic bankbook, for selectively reading out from the electronic bankbook only the transaction history which is relevant to the transaction types selected by the type selection means; and a query result presentation device for presenting to the customer the transaction history read out by the history querying means.

This transaction information processing device can be provided further with a code/character conversion means for converting the codes of the transaction types in the transaction history read out from the electronic bankbook, into character images. In this case, the transaction types are presented to the customer in a form of character images.

Further, this transaction information processing device can be provided further with a device connected to a bank host computer for performing on-line transactions, and it can be arranged so that this on-line transaction device and the above described history querying device operate in parallel with one another.

Further, in this transaction information processing device, it is also possible further to provide a device for obtaining the progress over time of the balance amount, and a device for performing asset analysis, based upon the transaction history which is recorded in the electronic bankbook.

The above described improved transaction information processing device, using as key the codes of the transaction types in the transaction history recorded in the electronic bankbook, selectively reads out from the electronic bankbook and presents to the customer only the transaction history which is relevant to the transaction types which have been selected by the customer. Accordingly, it is possible for the customer to obtain from a very large transaction history just the transaction history which he requires.

In the case that the code/character conversion device is further provided, the codes of the transaction types in the transaction history which was read out are converted into character images and presented to the customer. Accordingly, the customer can easily distinguish the presented types of the transaction history, and even if he has received a presentation of all of the transaction types it is easy to tell them apart.

In the case that an on-line transaction device is further provided and that the on-line transaction device and the history querying device can operate in parallel, then the burden in terms of time upon the customer is lightened, because the querying of the transaction history is also being performed while the on-line transaction is being performed.

In the case that the device for obtaining the balance progress or the device for performing asset analysis is further provided, then not only can the transaction history which has been read out from the electronic bankbook be presented just as it is, but also it can be presented to the customer after being processed so as to be helpful for asset employment.

4.4 Improvements for Making Cards More Convenient as Electronic Receipt Files

An electronic receipt file card according to the present invention has a recording medium for electronically recording receipt data including data which show a recipient (a payee), a payment amount, a payment date and time, and a validation code for checking the legitimacy of a receipt. This recording medium is one in which the receipt data can be written only once(for example, an optical recording medium). And the above described validation code is generated based upon at least one of the payment amount and payment date and time, and also upon a secret key specific to the recipient.

An electronic receipt entry device according to the present invention, which is that for electronically writing upon the recording medium the receipt data including the data which show a recipient, a payment amount and a payment date and time, comprises; a device for generating the validation code for checking the legitimacy of the receipt, based upon at least one of the payment amount and payment date and time, and also upon a secret key specific to the recipient; and a device for writing this validation code together with the receipt data upon the recording medium.

An electronic receipt read out device according to the present invention, which is that for reading out the receipt data including data which show a recipient, a payment amount, a payment date and time, and a validation code for checking the legitimacy of the receipt, from a recording medium upon which the receipt data are electronically recorded, comprises; a first calculation device for calculating a secret key which is specific to the recipient based upon the data read out from the recording medium showing the recipient and also upon a predetermined secret key for validation; a second calculation device for calculating a reference validation code based upon the secret key which is specific to the recipient and also upon at least one of the payment amount and payment date and time which have been read out from the above described recording medium; and a comparison device which compares together the reference validation code and the above described validation code, and for checking whether or not these two codes agree.

In the electronic receipt file card of the present invention there are electronically recorded data which show the recipient, the payment amount, the payment date and time, and the validation code for checking the legitimacy of a receipt (Here, "to electronically record" means to record in a data form which can be processed electronically by machines, and includes various recording methods such as magnetically, optically, magneto-optically and the like). The receipt data showing the recipient, the payment amount, and payment date and time can be read out from this card, and this card can be utilized for formal accounting processing instead of the prior art paper receipts, since, by utilizing the validation code included therein, it is possible to check whether or not the receipt data is something legitimate which is fitting as evidence, that is to say, whether or not it is falsified or counterfeit.

Here, the validation code is generated based upon at least one of the payment amount and the payment date and time, and also upon the secret key specific to the recipient. For this reason, in particular, falsification or faking of the amount of payment or the date and time of payment, which are the most important features, becomes difficult, accordingly a high reliability is obtained for the receipt data It may even be said that the reliability is higher than that of prior art paper receipts.

Further, since generally a card which has an electronic recording medium can record quite a large amount of data, it is possible to accumulate data representing a large number of receipts upon a single card, and processing them all together is easy.

Furthermore, since the electronic receipt data can be handed over to the person processing the receipts by an electronic signal transmission method, no troublesome management operations like those for prior art paper receipts are required.

For the recording medium upon the card, that of write-once type such as an optical recording medium is used. By this, phy al falsification of the receipt data becomes difficult, and a further level of safety is added.

With the electronic receipt entry device according to the present invention, the validation code is generated based upon at least one of the payment amount and the payment date and time, and also upon the secret key specific to the recipient; and this validation code is recorded in the electronic receipt file card together with the data which show the amount of the payment and the date and time of the payment. Since this validation code becomes a code which is specific to at least one of the amount of the payment and the date and time of the payment, and also to the recipient, when the receipt data are read out from this card, using this validation code makes it possible to check the legitimacy with respect to the payment amount, the payment date and time, and the recipient, which are the most important items upon the receipt. In other words, the fitness of the receipt data as evidence is assured.

With an electronic receipt read out device according to the present invention, when reading out the receipt data from the electronic receipt file card, first the secret key specific to the recipient is calculated based upon the data of the recipient in this receipt data and upon the predetermined secret key for validation, and next the reference validation code is calculated based upon the secret key specific to the recipient and upon at least one of the payment amount and the payment date and time in the receipt data. The reference validation code indicates that which the validation code should be when the receipt data read out is absolutely legitimate. Then, next, the reference validation code and the validation code which has been read out from the card are compared together. From the result of this comparison, it is checked whether or not the receipt data which have been read out from the card are legitimate.

4.5 Improvements for Issuing Electronic Checks in the Form of Electronic Data from IC Cards A system for issuing electronic checks according to the present invention comprises; an IC card having an IC chip in which are stored an usable money amount and a set money amount which determines the upper limit for the usable money amount; a card issue device for writing the set money amount in the IC chip of this IC card; and a payment processing device responsive to a payment amount which is input thereinto, for accepting the issue of an electronic check of the payment amount from the IC card and subtracting the payment amount from the usable money amount in the IC card only if the payment amount does not exceed the usable money amount in the IC card. And a rewrite restriction is set in the IC chip of the IC card with respect to the set money amount, and this rewrite restriction can not be lifted unless a rewrite authority key which only the payer knows is used.

It is desirable that an additional rewrite restriction is set in the IC chip with respect to the usable money amount, and this additional rewrite restriction never be lifted for any devices other than the card issue device and than the payment processing device.

It is also desirable that the IC card further comprises an auxiliary recording medium for unerasably storing an issue history including at least the payment amounts of electronic checks which have been issued, and that the payment processing device, when accepting the issue of the electronic check, writes the issue history of this issued electronic check into the auxiliary recording medium of the IC card.

According to the present invention, the usable money amount and the set money amount are stored in the IC chip of the IC card. The usable money amount represents the upper limit for the face value of a single electronic check which can be issued from this IC card. The set money amount represents the upper limit value for the usable money amount. And this set money amount cannot be rewritten by any person other than the payer.

The payer first writes the set money amount into the IC chip of the IC card using the card issue device, then the payer can hand over this IC card to another person to request him to do shopping and pay the bill by electronic check. The person who receives the request (the payment deputy) may make the shopping in accordance with the request, and can issue an electronic check by setting the IC card into the payment processing device which is provided in the shop and by inputting the amount for payment. At this time, the payment processing device receives the issue of an electronic check of this payment amount, only if the input payment amount is less than or equal to the usable money amount in the IC card. Then the payment processing device subtracts the payment amount from the usable money amount in the IC card.

Accordingly, each time an electronic check is issued, the usable money amount in the IC card is reduced by calculation. And the face value of a single electronic check is limited to being less than or equal to this reduced usable money amount. Further, the upper limit for the usable money amount is limited to being less than or equal to the set money amount which is written in the IC card in the beginning by the payer. As a result, the total value of the face values of the electronic checks which can be issued from this IC card comes to be limited to be less than or equal to the set money amount. Moreover, this set money amount can be rewritten only by the payer, and cannot be rewritten by the payment deputy.

As a result, the burden of danger upon the payer cannot exceed the set money amount which he has set in the beginning. On the other hand, it is very convenient from the point of view of the payment deputy, because it is not necessary ever to use cash, since it is possible to issue electronic checks with face values which match the amounts for payment on a case by case basis, provided that they are within the range of the usable money amount.

In the case that the additional rewrite restriction is imposed upon the usable money amount, the safety level is further elevated, since the payment deputy also cannot rewrite this amount at his own convenience. Further, if it is so arranged that the transaction history is unerasably stored into an auxiliary recording medium, then the degree of safety is even further elevated, since comparing together this history and the usable money amount makes it possible to check whether the check issues have been performed according to the requests.

5. BRIEF DESCRIPTION OF THE DRAWINGS

FIG. 1(a) is a front view of an electronic bankbook according to one embodiment of the present invention, FIG. 1(b) is a rear view thereof, and FIG. 1(c) is an explanatory figure showing the detailed bankbook information which is recorded in this electronic bankbook;

FIG. 3(a) is a front view of an electronic bankbook according to a second embodiment of the present invention, and FIG. 3(b) is a rear view thereof;

FIG. 4(a) is a front view of an electronic bankbook according to a third embodiment of the present invention, and FIG. 4(b) is a rear view thereof;

FIG. 5(a) is a front view of an electronic bankbook according to a fourth embodiment of the present invention, and FIG. 5(b) is a rear view thereof;

FIG. 6(a) is a front view of an electronic bankbook according to a fifth embodiment of the present invention, and FIG. 6(b) is a rear view thereof;

FIG. 7(a) is a front view of an electronic bankbook according to a sixth embodiment of the present invention, and FIG. 7(b) is a rear view thereof;

FIG. 8(a) is a front view of an electronic bankbook according to a seventh embodiment of the present invention, and FIG. 8(b) is a rear view thereof;

FIG. 9(a) is a front view of an electronic bankbook according to a eighth embodiment of the present invention, and FIG. 9(b) is a rear view thereof;

FIG. 10 is a memory map showing the relationship between an address table in an IC storage section of an electronic bankbook according to a tenth embodiment of the present invention and an optical storage section;

FIG. 12 is a memory map showing a concrete example of information registered in a payee information area in the same optical storage section;

FIG. 13 is a block diagram showing the construction of a payee entry device according to an embodiment of the present invention;

FIG. 15 is a memory map showing a transaction history storage area of an optical storage section of an electronic bankbook according to a twelfth embodiment of the present invention;

FIG. 21 is a figure showing an exemplary fee query result display from the same transaction information processing device;

FIG. 22 is a figure showing an exemplary fee query result printout from the same transaction information processing device;

FIG. 23 is a figure showing an exemplary balance progress query and asset analysis result display from the same transaction information processing device;

FIG. 25 is a structural diagram showing exemplary receipt data contents recorded in an electronic receipt slip card used by the same system;

FIG. 27 is a figure showing the flow of receipt issuing shop validation code replay processing of an electronic receipt reading out device for the same system;

6. THE PREFERRED EMBODIMENTS

Figure 2:
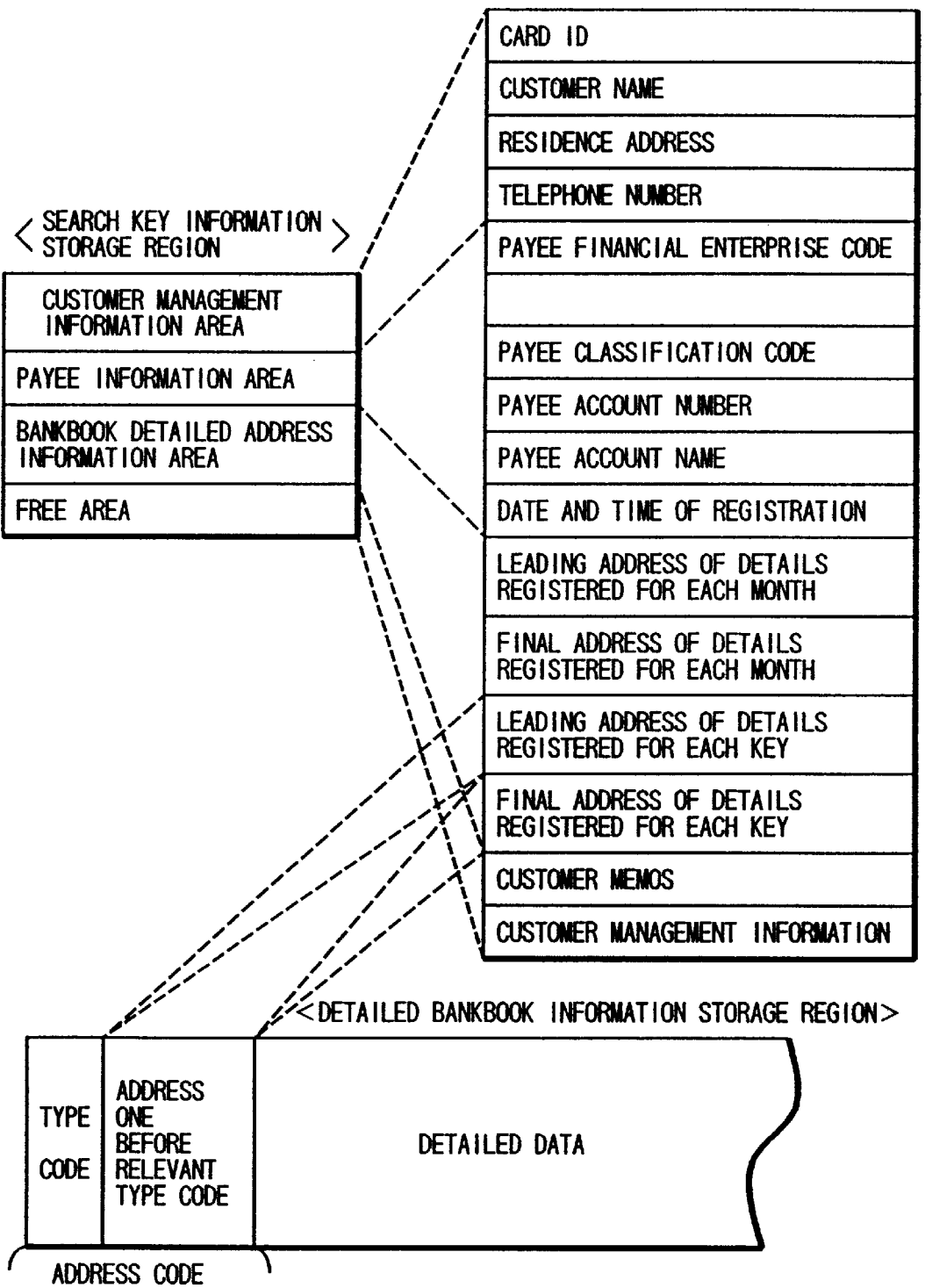
FIG. 2 is a data structure diagram for explanation of the relationship in this embodiment between search information storage regions and detailed bankbook information storage regions.

6.1 The Basic Construction of the Electronic Bankbook

FIG. 1(a) is a front view of an electronic bankbook according to one embodiment of the present invention, and FIG. 1(b) is a rear view thereof. In this electronic bankbook 1, an IC chip 11 is disposed in a region which is between an embossment 12 of a card base board 10 made of resin and a magnetic stripe 14, and which is to the left side of the card base board 10 when the magnetic stripe 14 is at the top thereof. An optical recording medium 13 is disposed upon the generally central section of the rear of the card base board 10, that is to say in a position which avoids the rear sides of the IC chip 11, the inscribed portion of the embossment 12, and the magnetic stripe 14.

The IC chip 11 is, for example, a conventional S type chip for IC card use which has a CPU and a semiconductor memory such as an EEPROM or the like, and in this semiconductor memory there is provided a search key information storage regions for storing payee information and search key information. The embossment 12 is formed in order to personalize the card.

The optical recording medium 13 consists of write-once type of megabyte units in which storage regions for a detailed bankbook information are provided, and their storage addresses are specified according to the above described search key information.

FIG. 1(c) shows the storage format for the items 101 to 107 ... of the detailed bankbook information actually stored in this storage region, and the data structure of one individual item 103 of detailed bankbook information.

Referring to FIG. 1(c), this individual item 103 of detailed bankbook information is made up of an address code 103a and detailed data 103b which show the particulars of an actual transaction, and the address code 103a is specified based upon the search key information which is stored in the semiconductor memory.

FIG. 2 shows the relationship between the search key information storage regions and the detailed bankbook information storage regions. In this embodiment, as search key information storage regions, there are provided a customer management information area, a payee information area, a detailed bankbook information address area, and a free area. The information recorded in the detailed bankbook information address area is used as search key information.

In the customer management information area there is recorded information related to the customer, for example the card ID and the name, the residence address, and the telephone number of the customer.

In the payee information area there is recorded information related to the payee, for example the payee financial institution code, the payee financial institution branch code, the payee classification code, the payee account name, the payee account number, the date and time of registration, and the like.

In the detailed bankbook information address area there is recorded address management information for detailed bankbook information about each individual transaction, for example the leading address of the details registered for each month, the final address of the details registered for each month, the leading address of the details registered for each key, the final address of the details registered for each key, and the like.

In the free area there is recorded any information determined by the customer or the company to which the customer belongs, such as for example customer memos, customer management information or the like.

The information stored in each area can be rewritten in any manner desired, and is managed by a programmed CPU on the IC chip 11. For example, every time when a money transfer to a new payee is performed, the payee information of the relevant payee can be added to or updated in the payee information area By doing this, it is possible to realize the function of a prior art money transfer card.

As the leading address of the details registered for each month and the final address of the details registered for each month, there are respectively stored the storage addresses of the transaction entries for the first and the last date/time of the relevant month. Moreover, it would also be possible to omit the final address of the details registered for each month.

Further, for each type such as deposit, withdrawal, ATM, automatic payment, gas bill payment, electricity bill payment, rent payment, loan installment payment, etc., the storage address in the detailed bankbook information storage region is stored as the leading address of the details registered for each key and the final address of the details registered for each key, and for each item of detailed bankbook information its type code and an address of one address before are added. The final address of the details registered for each key is updated each time detailed bankbook information corresponding to the relevant type code is entered, and the leading address of the details registered for each key is automatically stored when detailed bankbook information corresponding to the relevant type code is first entered.

Therefore, since the semiconductor memory of the IC chip 11 and the optical recording medium 13 are logically linked via the address information, it is possible to use the latter as a large capacity extended memory for the former. Further, it is possible to specify directly the storage addresses in the optical recording medium 13 of the detailed bankbook information just by referring to the detailed bankbook information address area of the IC chip 11, so that convenience when referring to the information and the like can be relied upon.

Although in the FIG. 2 example only one set of the leading and final addresses of the details registered for each key presented, in actual fact, the same number of the set of the addresses as that of the transaction types is stored, then it is possible to make additions of the set one by one each time the number of the types increases. Further, although not shown in the figures, of course it is possible to also use the registration address details for each classification or other address information, as search key information.

Referring again to FIG. 1, in the magnetic stripe 14 storage regions are provided for such information as stored in the conventional cash cards, loan cards and the like, and for the bankbook information such as the security codes (PINs), the bank codes, the bank account numbers for each handling item, the period of validity, the payable money amount, and so on. Accordingly, this electronic bankbook 1 can also be used as a cash card. Moreover, the detailed bankbook information, which is generated when this card is used for the above mentioned services, is recorded in the detailed bankbook information storage region of the optical recording medium 13 via the search information storage region in the IC chip 11.

In this manner, the electronic bankbook 1 of this embodiment offers the functions for the management of the information specific to the customer and the payee information and the like, for the tallying of several tens of times as much transaction history as in the case of a prior art paper bankbook, and for the querying of the tally information by high speed search, and also it can be used as a cash card or a loan card just as it stands. Accordingly, the following merits are brought to the bank and to the customer.

(1) The Merits from the Point of View of the Bank (A) Whereas in the past an inflating cost was entailed on the host computer side storage device for accumulating the bankbook data which have not yet been written in the bankbooks, it can be so arranged that the not yet written bankbook data is automatically written into the electronic bankbook 1 every time a card transaction is performed; therefore there is no necessity to preserve not yet written bankbook data for a long time period, and a considerable reduction in the cost of system resources can be anticipated.

(B) At the present, with many banks, the service is performed of printing the accumulated and not yet written bankbook data upon paper sheets and sending it to the customer, and the postal cost thereof has a tendency to increase; but with this electronic bankbook 1 this service no longer needs to be performed at all, if the not yet written bankbook data is reduced.

(C) The reduction in the cost for issuing money transfer cards, bankbooks, cash cards and the like is a serious problem with which all of the banks are concerned, but this problem can be easily resolved since the electronic bankbook 1 possesses all of these functions. Though at the present time the cost of issuing a single such electronic bankbook 1 is about twice the cost of issuing a paper bankbook or the like, its benefit is tremendous because it can store the same amount of information upon the optical recording medium 13 as in thirty or more paper bankbooks, and because it is not necessary to issue any money transfer card or cash card.

(D) Since when the electronic bankbook 1 is used the time required for bankbook updating by an AIM (automatic transaction machine) can be shortened to a great extent (can be shortened to about ⅓), therefore the turnover rate of customers is increased, and it is possible to reduce the number of ATM units.

(2) The Merits from the Point of View of the Customer (A) Since a cash card, a money transfer card, and a bankbook are unified, card management is extremely easy to perform, and further, since the bankbook is automatically updated when performing a card transaction, it is no longer necessary to be concerned about the bankbook, and it becomes possible to grasp each detail of all the transactions.

(B) It is possible to use the information in the electronic bankbook 1 as a data base related to one's own assets, and it is also possible to receive various added value services which the bank is prepared to offer from its own side with regard to this accumulated information.

In this manner, by disposing the IC chip 11, the embossment 12, the optical recording medium 13, and the magnetic stripe 14 as shown in FIG. 1, there is no need greatly to change the construction of a card according to the ISO/JISII standard, and moreover it is possible to realize the electronic bankbook 1 while counting upon interchangeability with systems which are already in existence. However, with the electronic bankbook of the present invention, while it is desirable to individually dispose the various recording mediums 11, 13, and 14 in regions which avoid the appropriate regions of formation of the embossment 12 on the card base board 10 so as not to suffer any influence from the corresponding reading out and writing means (card reader/writer), the construction is not necessarily limited to that shown in FIG. 1, and it is also possible to follow the constructions of FIG. 3 through FIG. 9.

Referring to FIG. 3 through FIG. 9, in each of them (a) is a front view of the electronic bankbook 2 through 8, while (b) is a rear view thereof. Further, 20, 30, 40, 50, 60, 70, and 80 are card base boards made of resin. Again, 21, 31, 41, 51, 61, 71, and 81 are IC chips, 22, 32, 42, 52, 62, 72, and 82 are embossments, 23, 33, 43, 53, 63, 73, and 83 are write-once type optical recording mediums, and 24, 25, 34, 44, 54, 64, 65, 74, 75, and 84 are magnetic stripes; and these respectively are elements which have the same functions as the IC chip 11, the embossment 12, the optical recording medium 13, and the magnetic stripe 14 which were shown in FIG. 1.

Among these electronic bankbooks 2 through 8, the ones shown in FIG. 3 through FIG. 7 are examples of the arrangement in the case that the embossments 22, 32, 42, 52, and 62 are formed as proud-indented configurations, while the ones shown in FIG. 8 and FIG. 9 are examples of the arrangement in the case that the embossments 72 and 82 are formed by decoration as proud configurations. In the case of the latter, the IC chips 71 and 81 and the optical recording mediums 73 and 83 are arranged in regions so as not to come into contact with the reading/writing device (reader/writer) for the magnetic stripes 74, 75, and 84.

Since by doing this it is possible efficiently to utilize the empty space on the card base boards 70 and 80, there is the beneficial point that it is possible for the capacity of the optical storage mediums 73 and 83 to be increased.

The electronic bankbook of this invention is not limited to the construction of the above described embodiments; constructional changes are possible within the range of non-deviation from its fundamental principles. For example, the type of search key information and the structure of the address code 103$a$ shown in FIG. 2 were exemplary, and these are not limited to the ones shown in the figure. Further, in these embodiments, a distinction was drawn between the payee information and the search key information, but it is also possible for the payee information to serve the same function as the search key information, and for detailed money transfer information to be stored upon the optical storage medium as detailed bankbook information.

6.2 Improvements for Making Money Transfer Procedures More Convenient

FIG. 10 shows a memory map of an electronic bankbook according to an embodiment of the present invention which is improved with regard to its money transfer functions. This electronic bankbook is an optical/IC (integrated circuit) hybrid card, and as storage devices, as shown in FIG. 10, it is equipped with a write-once type optical storage section 111 (hereinafter termed the "optical storage section") and a rewritable type storage section 113 within the IC (hereinafter termed the "IC storage section").

Figure 11:
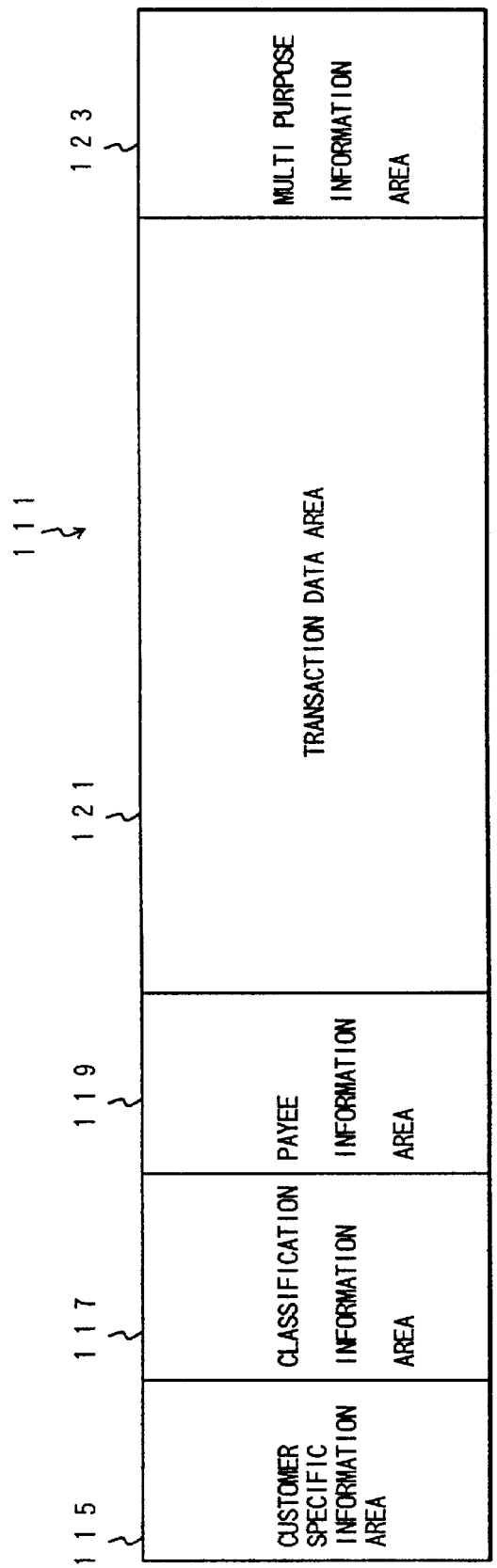
FIG. 11 is a memory map showing the area division of the storage section of the same electronic bankbook.

FIG. 11 shows a memory map of the optical storage section 111. In the optical storage section 111 there are written various items which are required for bank transactions, for example customer, type, payee, transaction data, and information related to other items (customer specification information, type information, payee information, transaction data, multi-objective information, etc.). For this reason, as shown in FIG. 11, with respect to the above described items, the optical storage section 111 is divided into a customer specification information area 115, a type information area 117, a payee information area 119, a transaction data area 121, and a multi objective information area 123. And, as shown in FIG. 10, it is so arranged that a plurality of entries (data) are written in each of these areas 115 through 123 for each item (for example, item A is customer specification, item B is type, item C is payee . . . ).

FIG. 12 concretely shows the entries which are stored in the payee information area 119 of FIG. 11 (the area C of FIG. 10), and in a single unit entry there are included a bank code 125, a branch code 127, an account number 129, and an error correction code 131 for a single payee. Moreover, this payee information area 119 is the one and only area within the optical storage section 111 upon which a payee entry device to be described hereinafter is permitted to write, and it is not possible for this payee entry device to perform writing upon the other areas 115, 117, 121, and 123.

As shown in FIG. 10, in the IC storage section 113 of the electronic bankbook there is provided a address table which establishes a correspondence between the keys which designate the above described items A, B, . . . and the addresses of the information areas for the items A, B, . . . within the optical storage section 111. This address table is provided for reference in order to obtain the address of the information area which is to be accessed, when an ATM or the payee entry device accesses the optical storage section 111 of this electronic bankbook.

FIG. 13 is a block diagram showing the overall construction of the payee entry device which is used for an electronic bankbook of the above described structure according to this embodiment.

This payee entry device may be realized by the use of a personal computer or an electronic notebook which are possessed by various customers, or may be a dedicated item of hardware (desirably a small size unit which can be carried around) with which the customer can freely enter the payee information into the electronic bankbook, regardless of the time or the place. This payee entry device, as will be described hereinafter, only performs writing into the payee information area 119 of the optical storage section 111 of the electronic bankbook, and since it unequivocally does not perform writing into the information areas which exert influence upon other bank transactions; therefore even if the customer uses it freely, no hindrance to bank transactions ever occurs, and accordingly it can exist quite independently of the bank computer system, and it is not necessary for it to be connected to any bank host computer like an ATM via any transmission line. For this reason, this payee entry device can be entirely for the personal use of the customer, and moreover it may be constructed as a small sized and portable device like an electronic notebook.

As shown in FIG. 13, this payee entry device is equipped with a data input device 141 for customer use, a display 143 for customer use, an electronic bankbook read/write device 145, a RAM 147, and a processing unit 149.

The data input device for customer use 141 is for inputting the payee information (i.e., the bank code, the branch code, and the account number and so on shown in FIG. 12) to the processing unit 149, and for this objective the provision of a numeric key pad will suffice, or of course a keyboard of a personal computer or an electronic notebook may be used just as it stands.

The display for customer use 143 is a device which exhibits, under the control of the processing unit 149, a display which invites the customer to input the bank code, the branch code, the account number and so on, or a display of the codes and/or numbers which have been input, or various error displays and the like, as described hereinafter.

The electronic bankbook read/write device 145 is that into which the electronic bankbook can be set, and which, under the control of the processing unit 149, accesses the IC and the optical storage section 111 of the electronic bankbook which is set, and writes payee information into the payee information area 119 (refer to FIG. 12) within its optical storage section 111.

The RAM 147 principally functions as a work area for the processing unit 149, and it temporarily stores the payee information which is input, retains the write point which specifies the address in the electronic bankbook at which this payee information is to be written, and is utilized for various other applications.

The processing unit 149 is a programmed microprocessor, and performs control operations as will be described hereinafter, in order to write the payee information which is input by the customer into the payee information area 119 within the electronic bankbook.

Figure 14:
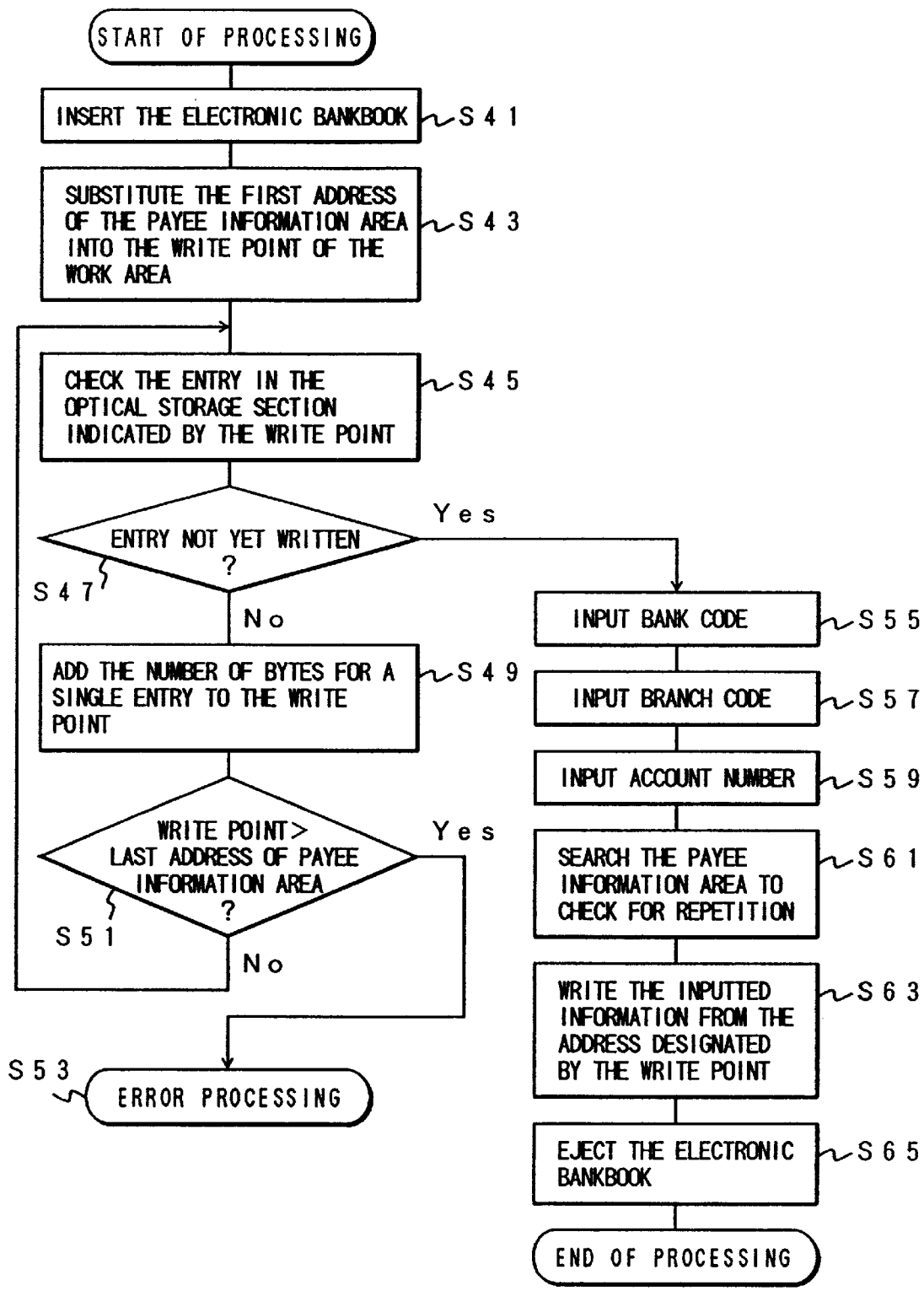
FIG. 14 is a flow chart showing the control operation of a calculation processing section of the same payee entry device.

FIG. 14 shows the control operations performed by the processing unit 149.

As shown in FIG. 14, first it is checked that the electronic bankbook is inserted into the electronic bankbook read/write device 145 (the step S41), and next the leading address of the payee information area 119 in the electronic bankbook is obtained from the electronic bankbook, and this leading address is substituted into the write point within the work area of the RAM 147 (the step S43).

In this step S43, the processing for obtaining the leading address of the payee information area 119 is performed as follows. First, a key which designates the term "payee information" which is programmed in advance is sent to the IC of the electronic bankbook. Then, since the leading address of the payee information area 119 is read out from the address table in the IC storage section 113 shown in FIG. 10, this leading address is received from the electronic bankbook.

When the write point has been set to the leading address of the payee information area 119, next the entry in the address within the optical storage section 111 which is designated by this write point is checked as to whether it is not yet written or whether writing therein has been completed (the step S45). If the result is that writing therein has been completed (the step S47), then a constant which is the number of bytes for a single entry is added to the write point (the step S49) in order to check the next entry, and the step S45 is repeated.

In this repetitive loop, if the value of the write point exceeds the last address of the payee information area 119 which is programmed in advance (the step S51), then, since the payee information area 119 is filled by this already recorded payee information, it is determined that further writing therein cannot be performed, and error processing such as display of an error message is performed (the step S53).

On the other hand, if in the above described repetitive loop the entry arrives at an address which has not yet been written in (the step S47), then first a message is displayed inviting the input of the bank code, and when the bank code is input by the customer it is retained in the work area of the RAM 147 (the step S55).

Next, a message is displayed inviting the input of the branch code, and when the branch code is input it is retained in the work area (the step S57), and next input of the account number is received in the same manner, and it is retained in the work area (the step S59).

When the above described input procedure has been completed, next the addresses of the payee information area 119 in which writing has been completed are searched, and it is checked as to whether an entry has not already been written which is identical with the bank code, the branch code, and the bank account number which have now been input (the step S61). If the result is that no identical entry is discovered, then the bank code, the branch code, and the account number which are being retained in the work area are written into the payee information area 119 from the address which is designated by the entry point (the step S63).

When the step S63 has been completed, the electronic bankbook is ejected from the electronic bankbook read/write device 145 (the step S65), and the payee entry processing is terminated.

It should be noted that the payee entry device is programmed so as not to write any information in areas other than the payee information area 119 of the optical storage section 111.

After recording the payee information as described above, when using this electronic bankbook to perform money transfer from an ATM, the customer sets the electronic bankbook into the ATM and selects "money transfer" from the console menu. Then the ATM refers to the address table of the IC storage section 113 of the electronic bankbook and obtains the leading address of the payee information area 119, and scans the payee information area 119 from this leading address and displays upon the console a list of the payee information which is registered therein. Next, when the customer has selected the intended payee from within this list, the ATM considers this selected payee information as inputted information, and executes procedures for this payee.

By the customer using the payee entry device in the above described manner at home or the like, he can register all of the possible payee information in the electronic bankbook in advance. Due to this, when in front of the ATM, even in the case of making a money transfer for the first time, it is possible to input to the ATM the payee information just by the simple operation of selecting a payee who has been already registered, and it is possible completely to eliminate the troublesome input work of the prior art in respect of the ATM. Further, mistaken input of the payee information is almost eliminated, and it is also very simple to perform money transfers to a plurality of payees. As a result, there is the merit from the point of view of the customer of being able to perform money transfer in a short time period, while from the point of view of the financial enterprise there is the merit that the working ratio of its ATMs and of its outlets is elevated.

Further, proficiency in the operation of the payee entry device is easy since it is ready to the hand of the customer, and in particular, if a personal computer or an electronic notebook is used, proficiency is all the more easy since it is of general applicability, and moreover it can be utilized at a time and place which suit the convenience of the customer. For these reasons, the operation of inputting payee information into the electronic bankbook using this payee entry device is extremely efficient as compared to the operation according to the prior art for inputting the payee information using an ATM which can only be used in an outlet of a financial institution during its working hours, and the burden upon the customer is small.

Now, the above description is related to one embodiment of the present invention, but of course the present invention is not limited to the above description.

For example, whereas in the above described embodiment the bank code, the branch code, and the account number and so on were limited to ones which were able to be inputted from a numeric key pad as payee information, it would also be favorable to arrange for it to be possible also to register index information in order to make it possible for the customer simply to distinguish the name of the payee; and, further, it would also be favorable to arrange for it to be possible to register a date for money transfer and/or an amount of money as well, in order to perform a money transfer of a fixed amount of money at a fixed interval. If this is done, the merits are obtained that it becomes very easy to select the intended payee from the list of payee information which is displayed upon the console of the ATM, and further that forgetting to perform a money transfer is reduced, and yet further that the process for inputting the amount of money can be eliminated.

Further, whereas in the above described embodiment the payee information was all inputted from the payee entry device, it would also be possible to add the function of reading out the payee information from the past transaction history in the transaction data area 121 of the optical storage section 111, or of reading out payee information the entry of which has been completed from the payee information area 119, and of writing this, just as it is or corrected, into the payee information area 119. By doing this, if the electronic bankbook has been used for some time, the merit is obtained that the trouble entailed by redundant input is eliminated in the case of then wishing to register a payee from the past using the payee entry device, or in the case of then wishing to register payee information which only differs by the account number from an item of payee information which is already registered, or the like.

For the ATM, it would also be favorable to arrange for the function to be added of, after a money transfer procedure has been executed, not only writing the money transfer history in the transaction data area of the electronic bankbook, but also writing this payee information in the payee information area of the electronic bankbook, automatically or alternatively upon the command of the customer, in the event that this item of payee information is one which has not previously been registered in the electronic bankbook. By doing this, it is possible to register a payee who has temporarily been input via an ATM in the electronic bankbook, even without using the payee entry device.

Further, it would also be favorable to endow the ATM, or the payee entry device, with the function of being able selectively to delete payee information from the payee information area, in consideration of the situation when the payee information area of the electronic bankbook has become full.

6.3 Improvements for Making Query Procedures for Recordings in the Electronic Bankbook More Convenient FIG. 15 is a memory map of an optical storage section which is fitted to an electronic bankbook according to an embodiment of the present invention which has been improved with regard to queries of recordings.

This electronic bankbook is a hybrid optical/IC card, and is equipped with a write-once type optical storage section 151 (hereinafter termed the "optical storage section") for storing transaction history, which can be written but cannot be rewritten.

As shown in FIG. 15, in an area for transaction history of the optical storage section 151, the transaction history is written item by item for each transaction, which includes items such as a date 153, a time 155, a bank code 157, a branch code 159, a classification code 161, a service type 163, an automatic payment type 165, an amount handled 167, a balance amount 169, and an error correction code 171. This transaction history is recorded in the date and time order in which the transactions were executed.

Figures 16, 17:
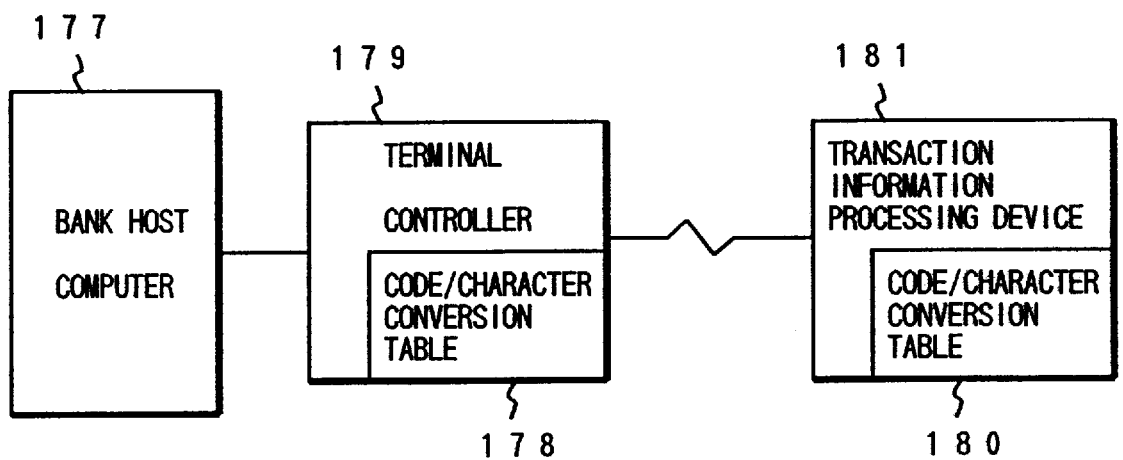
FIG. 16 is a figure showing the correspondence between types of transaction in the transaction history which is stored in the electronic bankbook and their codes.
FIG. 17 is a block diagram showing the relationship between a transaction information processing device according to a thirteenth embodiment of the present invention and a bank host computer.

Herein, the service type 163 and the automatic payment type 165 (which hereinafter will be termed the "transaction type" when referred to together) are, before stored in the electronic bankbook, classified and encoded by the bank host computer in detail as shown in FIG. 16.

FIG. 17 is a system structure diagram showing the relationship between a transaction information processing device for this electronic bankbook and a bank host computer.

Referring to FIG. 17, the transaction information processing device 181, for example an ATM, is connected along a dedicated line and via a terminal controller 179 to a bank host computer 177.

The transaction information processing device 181, in addition to the functions of a prior art ATM, is endowed with the function of querying the transaction history from the electronic bankbook, and the function of asset analysis based upon the transaction history which has been queried. The result of querying the transaction history or the result of the asset analysis can be exhibited upon the display or can be printed out. When doing so, in order to display the types of transactions in the form of character images, the code/character conversion table 180 is provided so as to convert the codes for transaction types, of which the detailed classification was shown in FIG. 16, into character images.

The bank host computer 177 is a device which performs processing so as to execute bank transactions of deposit, withdrawal, money transfer and the like for the account in response to demands from the transaction information processing device 181, sends the history of the transactions which have been executed to the transaction information processing device 181, sends past transaction history which has been requested to the transaction information processing device 181, and the like. In the event that the host computer 177 has executed a transaction with the transaction information processing device 181 on line, every time this happens, the transaction history is sent from the host computer 177 to the transaction information processing device 181 and is written into the electronic bankbook.

The terminal controller 179 functions as an interface for communicating between the host computer 177 and the transaction information processing device 181. A code/character conversion table 178 is also provided in this terminal controller 179. Principally, this code/character conversion table 178 is used, in connection with a transaction history which is sent to the transaction information processing device 181 from the host computer 177 in order to be printed into a prior art paper account bankbook, for changing the code of the transaction type into the character images; and, since the transaction history cannot be printed in characters in a paper bankbook with a detailed classification as shown in FIG. 16 and can only be printed with a more rough classification, in this table 178 the classification of the character images is more rough, as compared with the table of the transaction information processing device 181.

Figure 18:
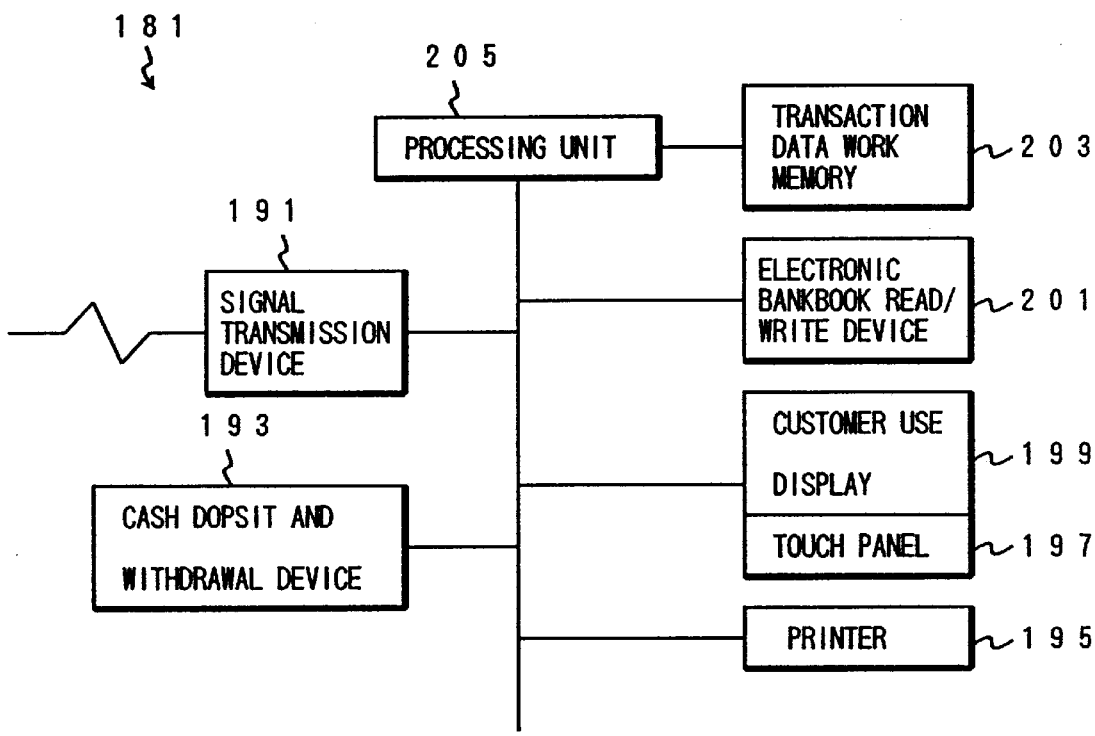
FIG. 18 is a block diagram showing the construction of the same transaction information processing device.

FIG. 18 is a block diagram showing the internal construction of the transaction information processing device 181.

As shown in FIG. 18, the transaction information processing device 181 is equipped with a signal transmission device 191, a cash deposit and withdrawal device 193, a printer 195, a touch panel (input device) 197, a display for customer use 199, an electronic bankbook read/write device 201, a transaction data work memory 203, and a processing unit 205.

The signal transmission device 191 is a device which is directly linked (on line) to the bank host computer 177 by communicating with the terminal controller 179 under the control of the processing unit 205 based upon a predetermined protocol, and which performs signal transmission control operations, such as exchanging various data which are necessary for this on line processing with the bank host computer 177, and releasing the on line state after the on line processing is completed, and the like.

The touch panel 197 is integrated as a single unit with the display 199, and is used by the customer to input transaction execution orders, information required for executing transactions, orders for queries about transaction history, methods of query, and the like upon an input screen which is presented by the display 199.

The display 199 is a device which presents to the customer an screen for input using the touch panel 197, and display screens for the results of transaction execution, the results of queries about transaction history, the results of asset analysis, and the like.

The printer 195 prints upon paper sheets the results of queries about transaction history and the results of asset analysis and the like.

The electronic bankbook read/write device 201 performs, under the control of the processing unit 205, writing and reading operations in relation to the electronic bankbook, such as setting the electronic bankbook, writing the transaction history which has been sent from the host computer 177 into the electronic bankbook, reading out transaction history which is stored in the electronic bankbook, and the like.

The cash deposit and withdrawal device 193 performs, under the control of the processing unit 205, the operations of receiving cash from the customer and of handing over cash, when executing transactions which are accompanied by the giving or receiving of cash.

The processing unit 205 is a programmed microprocessor which is connected to the various sections described above, and performs processing of information which is necessary for executing on-line transactions, queries relating to transaction history, asset analysis, and the like, and also performs control of the various sections described above.

The transaction data work memory 203 is used as a work memory by the processing unit 205, and temporarily stores the contents of transactions which have been input from the touch panel 197 when on-line transactions are being performed, transaction history which has been sent from the bank host computer 177, transaction history which has been read out from the electronic bankbook, the results of asset analysis, and the like. In addition, the code/character conversion table 180 which was shown in FIG. 16 and a margin/advice message conversion table which will be described hereinafter are also stored in this transaction data work memory 203.

Figure 19:
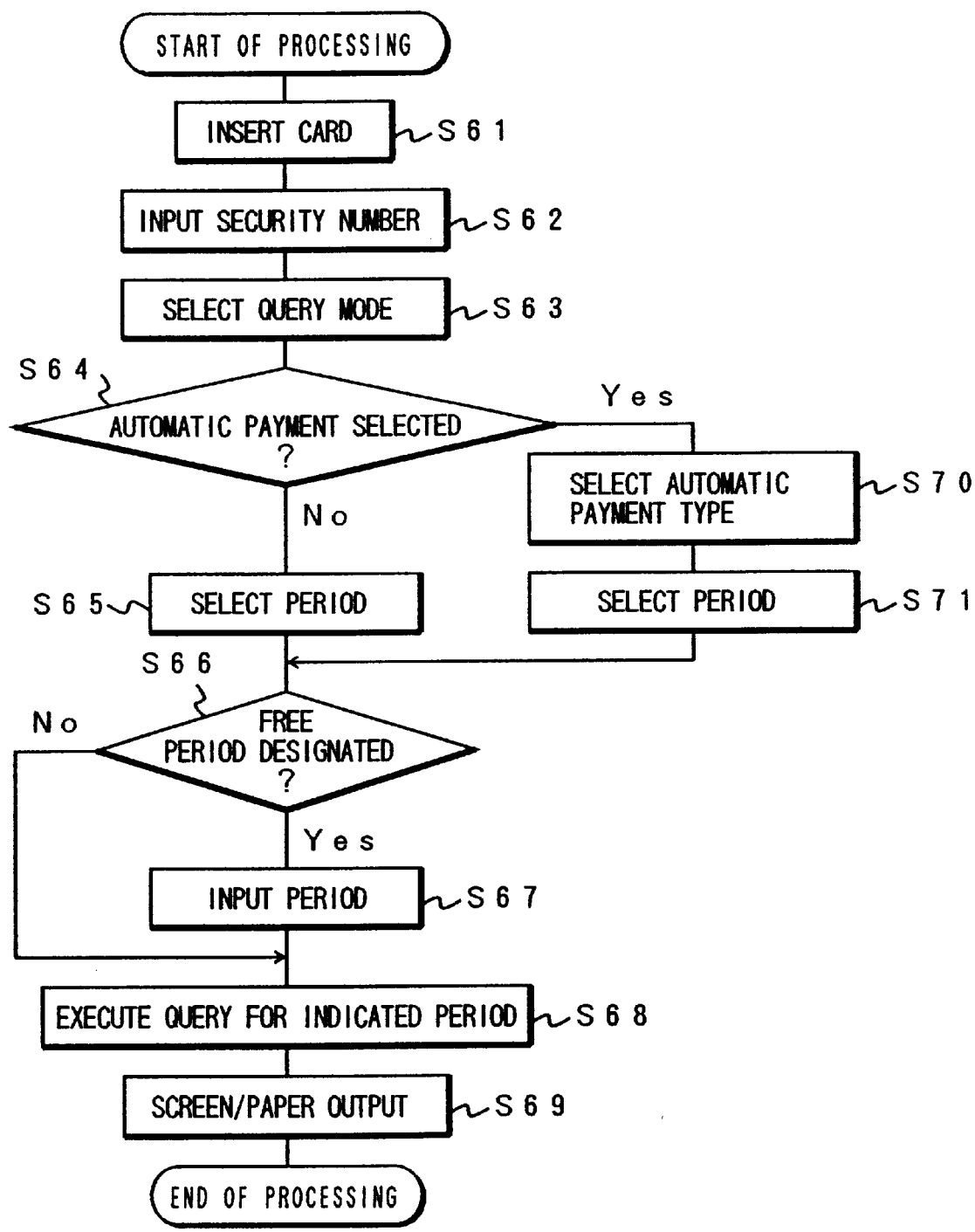
FIG. 19 is a flow chart showing the processing operation for transaction history query performed by the same transaction information processing device.

FIG. 19 shows the flow of query processing for transaction history which is performed by the transaction information processing device 181 constructed as described above.

As shown in FIG. 19, for the transaction information processing device 181, first the electronic bankbook is inserted into the electronic bankbook read/write device 201 (the step S61), next it checks that the security number has been input correctly via the touch panel 197 (the step S62), and next it enters into selection processing for the query mode (the step S63). In this query mode selection processing a query mode selection menu is displayed upon the display 199, and the customer selects one of the query modes from this menu by using the touch panel 197.

Now, although it is not so shown in the figures, simultaneously with this selection of the query mode, or before or after it, the selection of whether or not an on-line transaction is to be performed is also performed by using the touch panel 197. And, if an on-line transaction has been selected, in parallel with the processing shown in the figure from the step S63 downwards, the processing of the on-line transaction is also executed. However, since the processing of the on-line transaction is identical to that performed in the prior art and is something for which special explanation is not required for a person skilled in the relevant art, explanation thereof will be curtailed.

Anyway, in the selection of query mode in the step S63, it is possible to select any of the following nine query modes.

(1) Normal Type Query Mode

All of the transaction history written in the electronic bankbook is queried. That is to say, all of the items 153 through 169 (refer to FIG. 15) in the range of all of the service types 00 through 05 (refer to FIG. 16) are queried.

(2) Balance Progress Query Mode

Within the range of all of the service types 00 through 05, the balance amount 169 and the other accompanying items (the date and time 153 and 155, the bank code 157, the branch code 159, etc.) are queried.

(3) Cash Deposit Query Mode

For the service type 00 (cash deposit), all of the items 153 through 169 are queried.

(4) Salary or Bonus Query Mode

For the service type 01 (salary or bonus), all of the items 153 through 169 are queried.

(5) Payment Query Mode

For the service type 02 (Payment), all of the items 153 through 169 are queried.

(6) Cash Withdrawal Query Mode

For the service type 03 (cash withdrawal), all of the items 153 through 169 are queried.

(7) Automatic Payment Query Mode

For the service type 04 (automatic payment), all of the items 153 through 169 are queried.

(8) Fee Query Mode

For the service type 05 (card fee), all of the items 153 through 169 are queried.

(9) Asset Analysis Mode

This can be selected when the balance progress query mode has been selected, or when performing an on-line transaction. The least balance amount from all of the transaction history (that is, the amount which the customer has not made use of even once) is calculated along with the interest respectively in the case for this being a normal deposit account and in the case for this being a fixed term deposit account, the difference amount between these two interest values is obtained, and an advice message corresponding to this difference amount together with a balance progress result or a transaction result is offered to the customer.

When one has been selected from among these nine query modes, next a check is made as to whether or not the selected query mode is the automatic payment query mode (the step S64). If the result is that it is not the automatic payment query mode, then next a menu screen is displayed (the step S65) for selection of the period which it is desired to query. On this menu, for example, it may be possible to designate the last month, the last three months, or a free period.

On the other hand, if the selected query mode is the automatic payment query mode, then next selection processing is entered upon for the type of automatic payment (the step S70). That is to say, a menu screen is displayed in order to select the type which it is desired to query from among the seven kinds of automatic payment type shown in FIG. 16, and any one of the types is selected by the customer via the touch panel 197. On this selectable menu there are available eight choices: one in which all of the payment types are queried, and seven others in each of which an individual one of the seven types of automatic payment is individually queried.

When this selection of the automatic payment type has been completed, next a menu screen for selection of the period is displayed (the step S71), in the same way as in the case of the step S65. However, in consideration of the fact that automatic payment are usually performed every month, on the menu this time it may for example be possible to designate the last three months, the last one year, or a free period.

Next, it is checked as to whether the customer has selected from the touch panel 197 the designation of a free period or whether he has designated a fixed period like three months or one year (the step S66), and in the case of designation of a free period a period input screen is displayed and the customer inputs the period which he desires to query (the step S67).

After this, within the range of the transaction types which correspond to the query mode which the customer has selected and within the range of the selected period, the transaction history is read out from the optical storage section 111 of the electronic bankbook, and is temporarily stored in the transaction data work memory 203 (the step S68).

Next, along with displaying this read out transaction history upon the display 199, the customer is questioned as to whether or not he requires it to be printed, and if the customer so requires then it is printed using the printer 195 (the step S69). At this time, the service type 163 and the automatic payment type 165 in the transaction history which is read out from the electronic bankbook are converted from codes to character images according to the code/character conversion table 180 in the transaction information processing device 181, and are displayed and printed. By doing this, it is possible for the customer clearly to recognize the types of transactions in the transaction history which he has queried.

Now, if this query was made in parallel with an on-line transaction, the result of the on-line transaction is also displayed and/or printed, together with the transaction history which was queried. In this case, the transaction type of the on-line transaction result is also converted from code to character images.

Further, if the time period which was designated by the customer exceeds the time period range of the transaction history which is recorded in the electronic bankbook, then if the query was made in the on-line state this on-line state is taken advantage of, or if on the other hand the query was made in the off-line state automatically connection is established with the bank host computer 177 and the on-line state is established, and at least the transaction history for the portion of the time period which has exceeded is caused to be transmitted from the bank host computer 177 and received. By doing this, querying of the transaction history can be performed not only for the time period range which is recorded in the electronic bankbook, but also for the time period range for which service by the bank host computer 177 is possible. In this case, although it would be possible to so arrange matters that only the transaction history for the type of transaction corresponding to the query mode was selected from the side of the bank host computer 177 and was transmitted to be received, it is more desirable to transmit and receive the transaction history for all of the transaction types from the bank host computer 177, and, having stored it in the transaction data work memory 203 of the transaction information processing device 181, to select only the type of transaction corresponding to the query mode and display and/or print it, because this lightens the processing burden upon the bank host computer 177, and moreover enables the on-line state to be released more quickly, and furthermore makes it possible thereafter freely to change the query mode at the free will of the customer.

Figure 20:
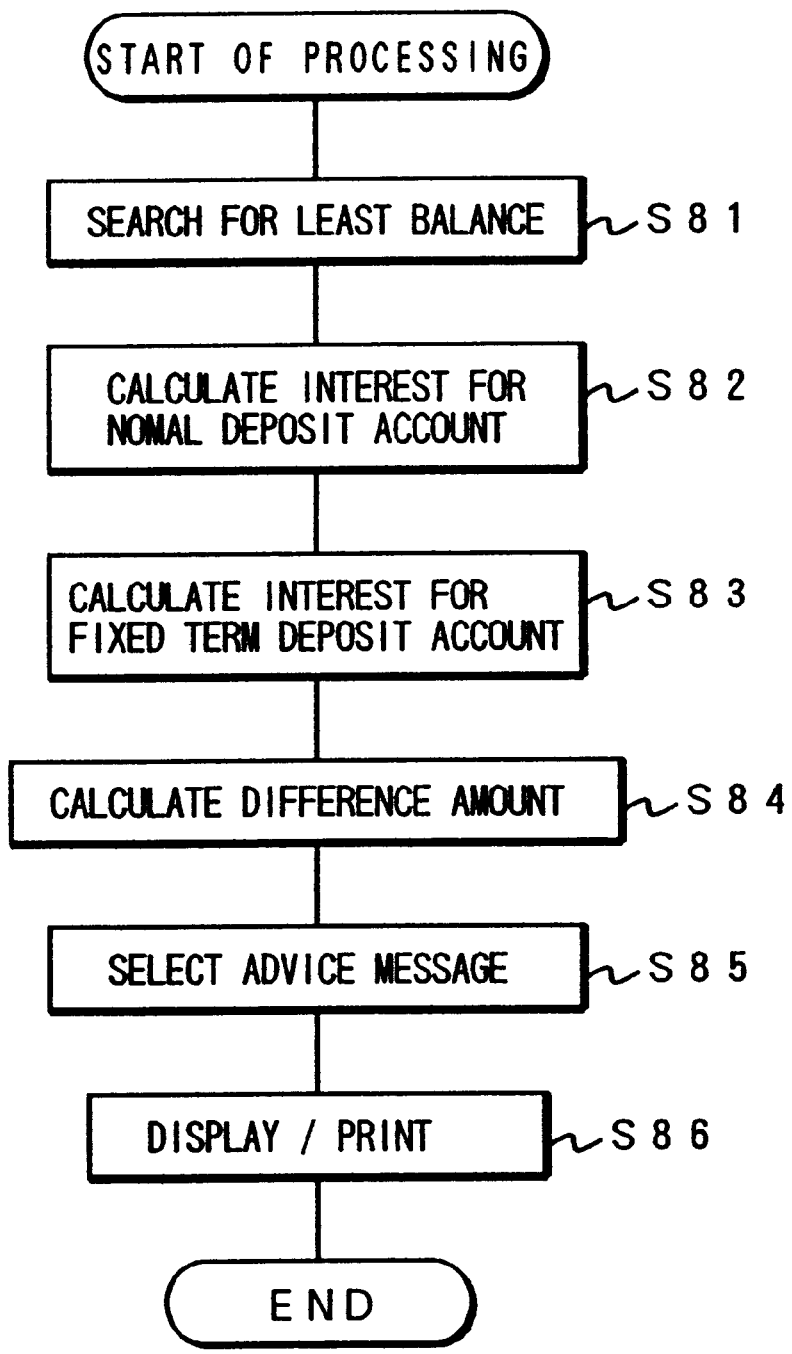
FIG. 20 is a flow chart showing the processing operation for asset analysis performed by the same transaction information processing device.

Incidentally, when the asset analysis query mode was selected in the step S63 of FIG. 19, in the processing in the step S68 of FIG. 19, after reading out from the electronic bankbook the balance amount for the designated period, further special processing is performed for asset analysis. FIG. 20 shows the flow of this special processing for this asset analysis.

First, a search is performed for the least balance amount from the balance amount list which has been read out (the step S81), and the interest is calculated for the case that this least balance amount is in a normal deposit account (the step S82). Next, the interest is calculated for the case that this least balance amount is in a fixed term deposit account (the step S83), and the amount of difference between the amount of interest for the case of a normal deposit account and the amount of interest for the case of a fixed term deposit account is calculated (the step S84). And an advice message is selected based upon this amount of interest difference (the step S85), based upon an interest difference amount/advice message conversion table which has been previously prepared in the transaction data work memory 203; and this message is exhibited upon the display 199, and/or, if the customer so requests, it is printed out via the printer 195 (the step S86). By presenting an advice message to the customer in this manner, it is possible to contribute effectively to improvement of the manner in which the customer employs his assets, as compared to simply presenting the result of calculation of the amount of interest difference.

FIG. 21 and FIG. 22 respectively shows an exemplary display of the result of a transaction history query and an exemplary printout thereof. The examples shown in these figures are for the case of the fee enquiry mode, but, as will be understood from these examples, only the transaction history for the type of transaction which is selected by the customer is presented, and moreover, since the queried transaction type is shown in character images, from the point of view of the customer only the necessary information is obtained without anything useless, which is very convenient.

FIG. 23 shows an exemplary display (or an exemplary printout) of the results, when a balance progress query and an asset analysis have together been performed. As shown in the figure, when the balance progress query is performed, along with showing the balance by a line graph 211, when further the asset analysis is performed, an advice message 213 which is the result of the analysis is displayed. By doing this, along with the customer being able to apprehend the progress of his balance at a glance, moreover it is very convenient because he can also receive advice for the employment of his assets. Furthermore, when performing asset analysis together with an on-line transaction, the result of the on-line transaction is displayed in the same manner.

Since, according to the above described embodiment, as has been explained above, it is arranged that the transaction history which is desired by the customer is selected and displayed and/or printed out from among the transaction history recorded in the electronic bankbook by using the codes of the detailed transaction types which are included therein, therefore no difficulty is required for selecting information which is necessary to the customer from among an immense transaction history, and searching of the transaction history becomes easy.

Further, since querying of the transaction history or asset analysis can be performed in parallel with an on-line transaction, therefore from the point of view of the customer it is possible to receive these services without suffering any burden in time terms.

Further, by taking advantage of the on-line service, queries are also possible for time period ranges which are not recorded in the electronic bankbook.

Yet further, since it is so arranged that the codes for the detailed transaction types are converted into character images and displayed and/or printed, thereby, along with the customer himself being able to check what are the transaction types which he has queried, it also becomes easy for the customer to tell apart the enquiry results for each of the transaction types and to pick out only the specified transaction type, even if he has made a query for all of the transaction types taken together. Additionally, since the code/character conversion table is provided in the transaction information processing device, the transaction types can be converted into character images without any dependence upon the terminal controller.

Furthermore, also the feature is convenient from the point of view of the customer that not only can he simply make queries relating to transaction history, but also he can query balance progress and asset analysis, and can obtain help with employment of his assets.

Now, the transaction information processing device of the present invention may also be constituted as a device for use by a customer who is an individual user and who employs a personal computer or the like. Further, the specifics of the asset analysis could also be arranged to be specifics which were more complicated, multifarious, and diverse than those of the above described embodiment.

6.4 Electronic Receipt Files

Figure 24:
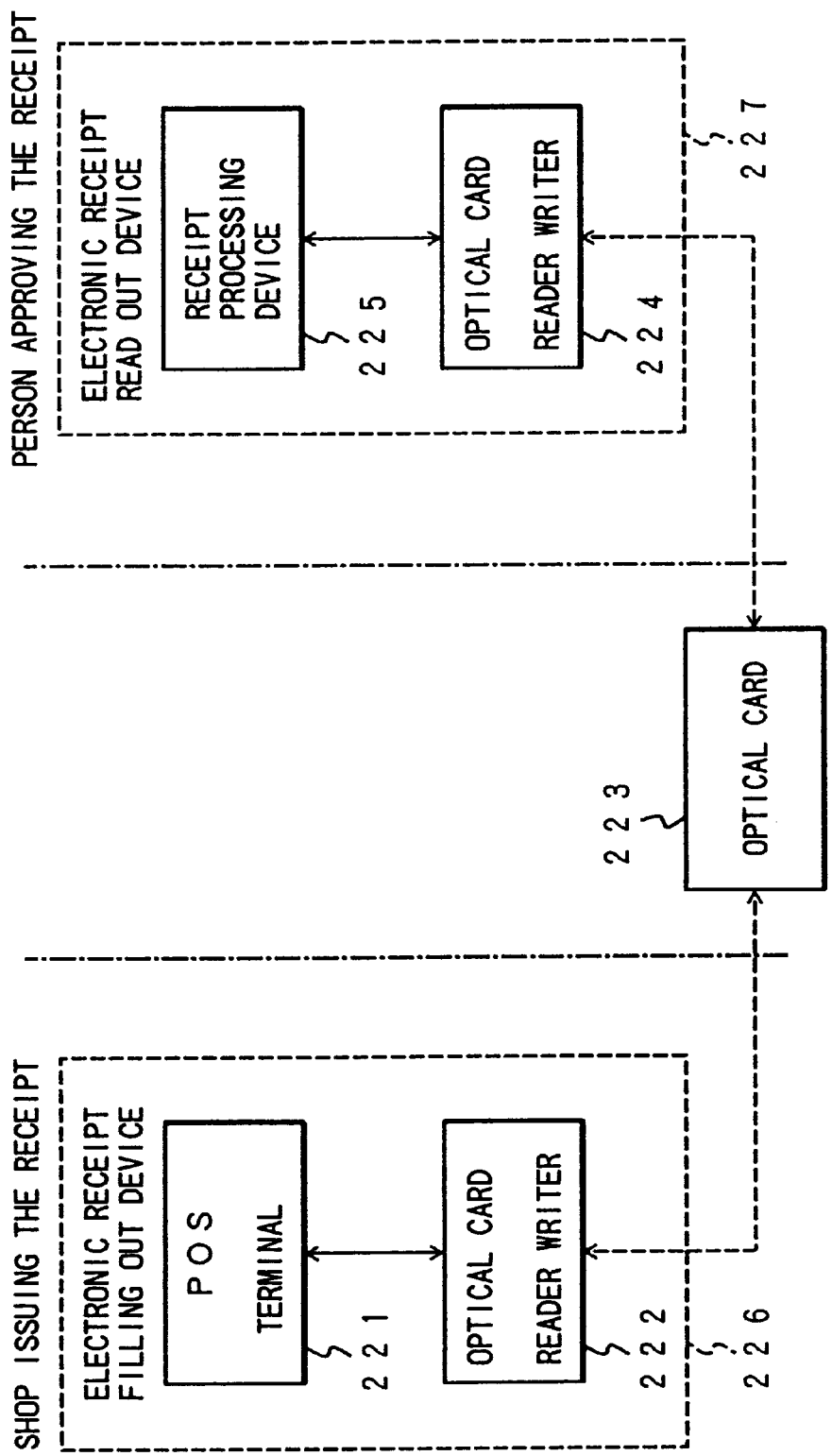
FIG. 24 is an overall organizational diagram showing an electronic receipt processing system according to a fourteenth embodiment of the present invention.

FIG. 24 shows the overall organization of an electronic receipt processing system to which the present invention is applied. In the same figure, the shop issuing the receipt corresponds to the money recipient of the present invention, and the person approving the receipt is the subject who has authority to decide upon the legitimacy of the receipt, such as the tax office or the like.

An electronic receipt filling out device 226 in the shop is made up of a POS terminal 221 and an optical card reader writer 222 which is connected thereto.

On the other hand, an electronic receipt read out device 227 which is on the side of the person who is to approve the receipt is made up of a receipt processing device 225 and an optical card reader writer 224. The POS terminal 221 and the receipt processing device 225 may be dedicated devices, or may be devices such as personal computers constructed from general use hardware.

The optical card 223 corresponds to an electronic receipt file card according to the present invention, and is provided upon its surface with an optical recording medium in which receipt data is electronically recorded. Since the data is recorded upon this optical recording medium by digging minute holes or so called pits therein, only once writing data thereto is possible, while rewriting is not possible. This optical card 223 is carried by the payer who has made purchases or the like in the shop, and is set into the optical card reader writer 222 in the shop in order to write receipt data therein; and further, on the side of the person who is to approve the receipt, is set into the optical card reader writer 224 in order to read out the receipt data.

Now, it would also be acceptable to use, instead of the optical card 223, an IC card or a hybrid optical/IC card. However, from the point of view of preventing phy al falsification of the receipt data, it is preferable to record the receipt data upon an optical card or upon the optical recording medium of a hybrid card, since in this case rewriting the data is impossible, rather than to write the receipt data upon an IC card or into the IC memory of a hybrid card.

FIG. 25 shows the concrete contents of the receipt data recorded in this optical card 223. In this figure, the receipt data contains the name of the shop which issues the receipt, the address of the shop, the telephone number of the shop, the amount paid, the date and time of payment, the reason for payment, the shop ID, the shop validation code, and a check code for error checking. Here, the shop ID is an identification code, unique to the shop, which is given in advance to the shop which issues the receipt. Further, as will be described hereinafter, the shop validation code is produced using a prescribed encryption algorithm in the shop which issues the receipt, based upon a shop individual key which is previously registered in the terminal of the shop (a secret key which is only known to that shop) and also upon the purchase amount and the purchase date and time; therefore the validation code is individual to the purchase amount, the purchase date and time, and the shop which issues the receipt. The above described shop individual key which is used when creating the shop validation code, as will be described hereinafter, is produced using a prescribed encryption algorithm, based upon a prescribed key for the person giving approval (a secret key which is only known to the person who has authority to authorize the receipt, like the receipt authorizing person) and upon the above described shop ID.

Next, the operation of this system will be explained.

First, when the payment is to be performed in the shop, the optical card 223 of the payer is set into the optical card reader writer 222 at the shop. Then the receipt data, which contains the items such as the shop ID, the amount of the payment, the date and time of purchase and the like, is set up in the POS terminal 221 and is recorded unerasably on the optical card 223 by the optical card reader writer 222.

Figure 26:
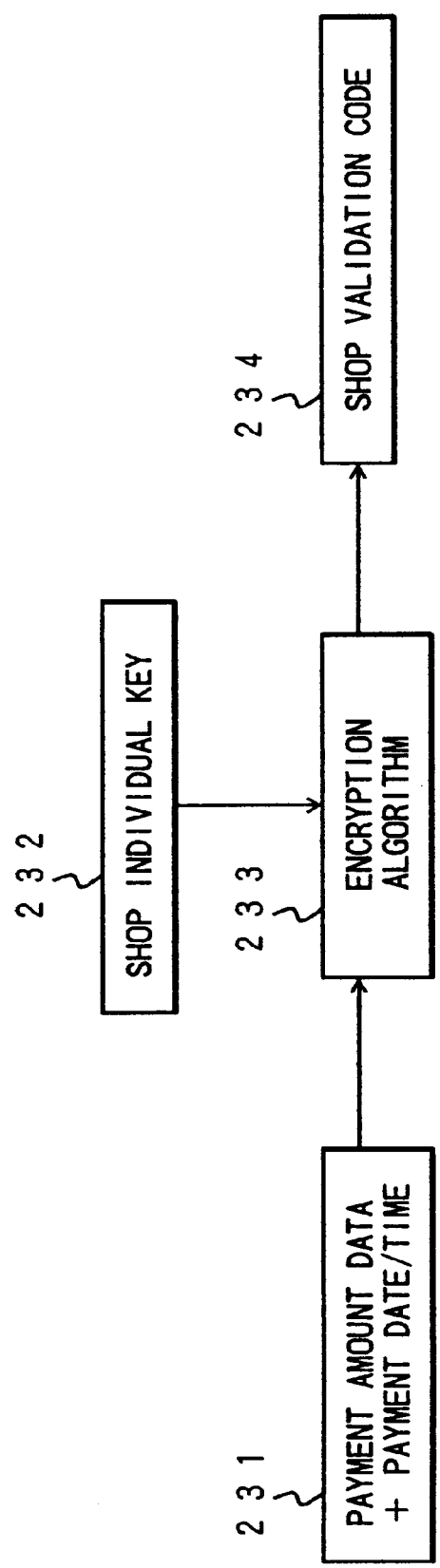
FIG. 26 is a figure showing the flow of processing for receipt issuing shop validation code generation by an electronic receipt filling out device for the same system.

When setting up this receipt data, the above described shop validation code is generated according to a processing flow as shown in FIG. 26. Namely, when the amount of the purchase has been input to the POS terminal 221, this purchase amount and the purchase date and time are linked together, and this linked data 231 is input into an encryption algorithm 233. The encryption algorithm 233 generates the shop validation code 234 using the shop individual key 232 which is registered in advance and the above described linked purchase amount and date and time data 231.

As will be clear from this procedure, the shop validation code 234 is created as a code which is unique to the amount of the payment, the date and time of purchase, and the shop which issues the receipt. Accordingly it is possible to check whether the receipt data related to the purchase amount, the purchase date and time, and the receipt issuing shop is legitimate or not by utilizing this validation code 234. For example, if the payer makes an attempt to falsify receipt data in the card 223 by using his own personal computer, even if he tries to fabricate fake receipt data and to enter it into the card 223, he cannot manufacture a shop validation code 234 which matches the falsified or faked amount of payment and the date and time of payment and the receipt issuing shop, since the payer does not know the shop individual key 232. As a result, it is possible to detect that this falsification or faking has been performed, by the shop validation code 234 being checked afterwards on the side of the person who is to approve the receipt. Now, with regard to falsification, the fact that the optical card 223 can only be unerasably written makes falsification yet more difficult.

By doing the above, the receipt data is written into the optical card 223. Thereafter, if the payer for example files a tax return application, this optical card 223 or its reproduction is sent to the person who id to approve the receipts (for example, the tax office), together with the application document. This optical card 223 is then set into the optical card reader writer 224 by the person who is to approve the receipts, and the receipt data in the optical card 223 is electronically read out via the optical card reader writer 224 into the receipt processing device 225 as receipt data, and may be exhibited upon a display, may be printed out, or may be transferred to any required calculation process. For example, it is possible in a single operation to execute the bookkeeping process such as reading out all of the receipt data carried upon this card which falls within a fixed time period, and then calculating the total amount of the payments thereof, or the like. Moreover, it would also be acceptable for the optical card 223 not to be directly handed over to the person who is to approve the receipts, but for the required receipt data to be read out on the side of the payer and to be sent via a communication network to the processing device 225 on the side of the person who is to approve the receipts.

In this connection, when the receipt processing device 225 has read out the receipt data, checking processing is performed by a procedure as shown in FIG. 27 in order to verify the legitimacy of this receipt data.

First, a key 242 for the person giving approval, which is a secret key which is registered in advance in the receipt processing device 225, and the shop ID 241, which is included in the receipt data which has been read out from the card 223, are transferred to an encryption algorithm 243. This encryption algorithm 243 generates an shop individual key 244, using the key 242 for the person giving approval and the shop ID. This shop individual key 244 is identical with the shop individual key (denoted in FIG. 26 by the reference umber 232) which is specific to the shop designated by the shop ID.

Next, the shop individual key 244 which has just been made and the linked purchase amount and purchase date and time data 245 included in the receipt data which were read out are transferred to an encryption algorithm 246. Here, although it is not necessary for this encryption algorithm 246 to be the same as the above described encryption algorithm 243, it is the same as the encryption algorithm 233 of FIG. 26. This encryption algorithm 246 generates a reference shop validation code 247, using the shop individual key 244 and the linked purchase amount and purchase date and time data 245.

This reference validation code 247 should be identical with the shop validation code included in the receipt data, if the amount of payment and the date and time of payment and the shop ID in the read out receipt data are correct.

Next, this reference shop validation code 247 and the shop validation code 234 contained in the read out receipt data are compared by a comparison processor 248. If the result is that they agree, then it is judged that this receipt data item is a legitimate one, and may be used as evidence; but if the result is that they do not agree, then it is judged that this receipt data item is an incorrect one that has been falsified or faked, and may not be used as evidence.

As described above, checking processing can be performed with regard to the receipt data that has been read out from the optical card 223 so as to determine whether or not it is legitimate, and since it is possible to extract only the legitimate receipt data, this receipt data can be used in formal accounting processing in place of the prior art paper receipts. Moreover, it can even be said that the reliability is higher than that of paper receipts.

Now, although in the above described embodiment the shop validation code was generated from the amount of payment and the date and time of payment which were the most important items among the receipt data, it would alternatively also be acceptable to add other information, and further it would also be acceptable to use only one of the amount of payment and the date and time of payment, if there were no problem from the point of view of suitability for evidence.

Further, although in the validation processing the shop individual key was first generated and then based upon this key the reference validation code was generated, it would also be acceptable to generate the reference validation code by a different algorithm.

6.5 A System for Issuing Electronic Checks

Figure 28:
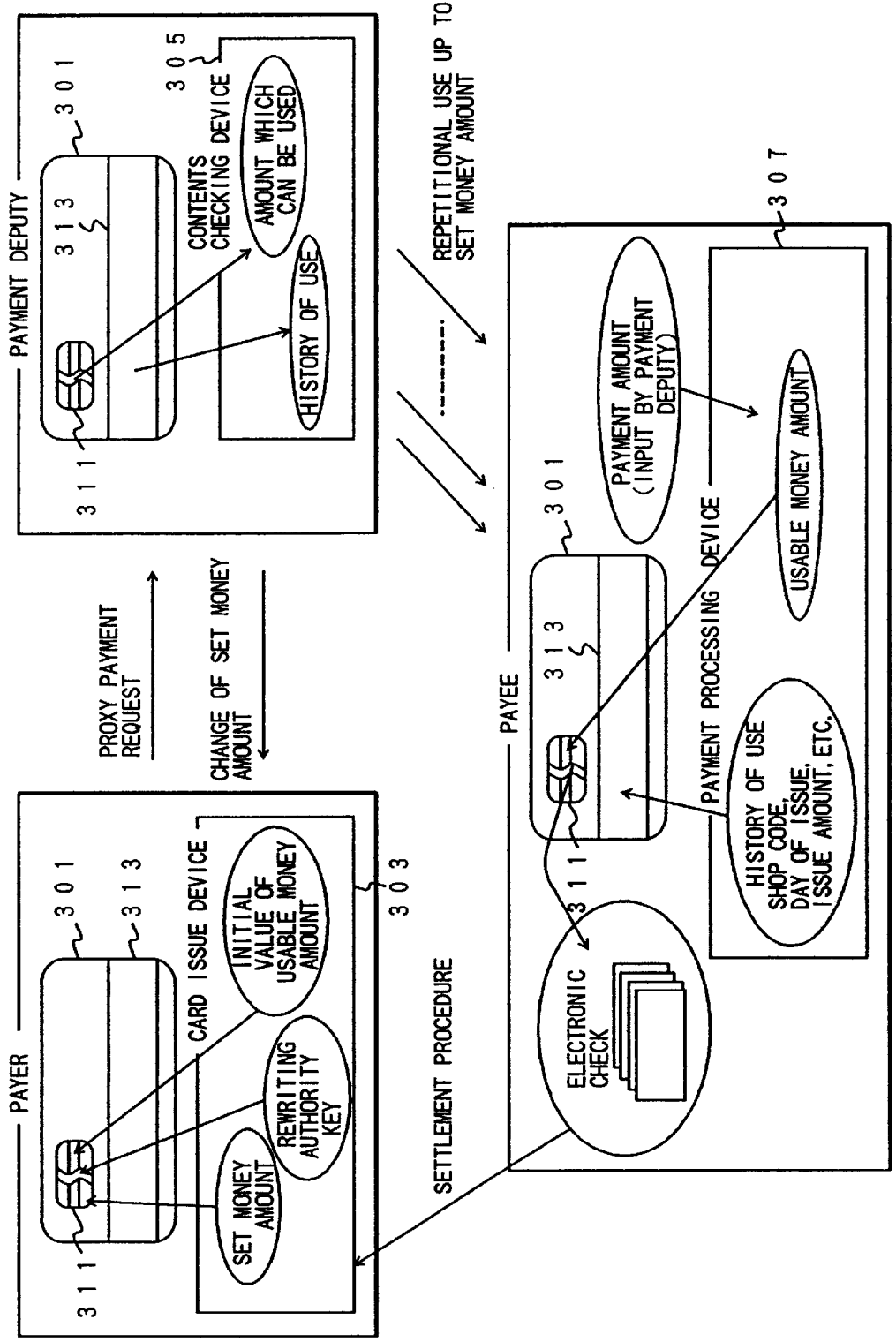
FIG. 28 is a block diagram showing the overall organization of an electronic checking system according to a fifteenth embodiment of the present invention.

FIG. 28 shows the overall organization of a system for issuing and processing checks in the form of electronic data (hereinafter termed "electronic checks") according to an embodiment of the present invention.

As subjects who deal with electronic checks, there may exist three persons: the payer, the payment deputy, and the payee. Here, the payer is the person who substantially pays money for settlement of the electronic check. The payment deputy is the person who is requested by the payer to take the procedure of issue of the electronic check. And the payee is the shop or person who receives the electronic check from the payment deputy, and who, according to the settlement procedure therefor, receives the actual money from the payer.

The IC/optical hybrid card 301 (hereinafter simply termed the "card") is prepared as a medium for the issue of electronic checks. This card 301, if considered as paper checks, performs the function of an unwritten checkbook, and the payer issues it and the payment deputy carries it away.

This card 301, as will be explained in detail hereinafter, is equipped on its surface with an IC chip 311 which has an excellent security function, and with an optical recording medium 313 of high capacity. Moreover, it is not absolutely necessary that the medium for issue of the electronic check of the present invention should be such a hybrid IC/optical card 301; it will be acceptable if only an IC chip which has an excellent security function is provided, or if it is a IC card in the narrow sense or a hybrid IC/magnetic card or the like. That is, if it is an IC card in the broad sense, anything will do.

A card issue device 303 is provided for the payer for writing on the card 301 the information which is necessary for issuing the electronic check. And a contents checking device 305 is provided for the payment deputy for checking the contents recorded upon the card 301. Further, a payment processing device 307 is provided for the payee for receiving the issue of the electronic checks from the card 301 and performing processing for settlement of the electronic checks which have been received.

The card issue device 303, the contents checking device 305, and the payment processing device 307 may of course be constituted as dedicated devices, or they may be constituted as general purpose devices like personal computers to which card reader/writers have been connected, with the appropriate application software being installed thereon. Since their concrete construction can be easily realized from publicly known art by one skilled in the relevant art, the detailed description thereof will be curtailed.

Figure 29:
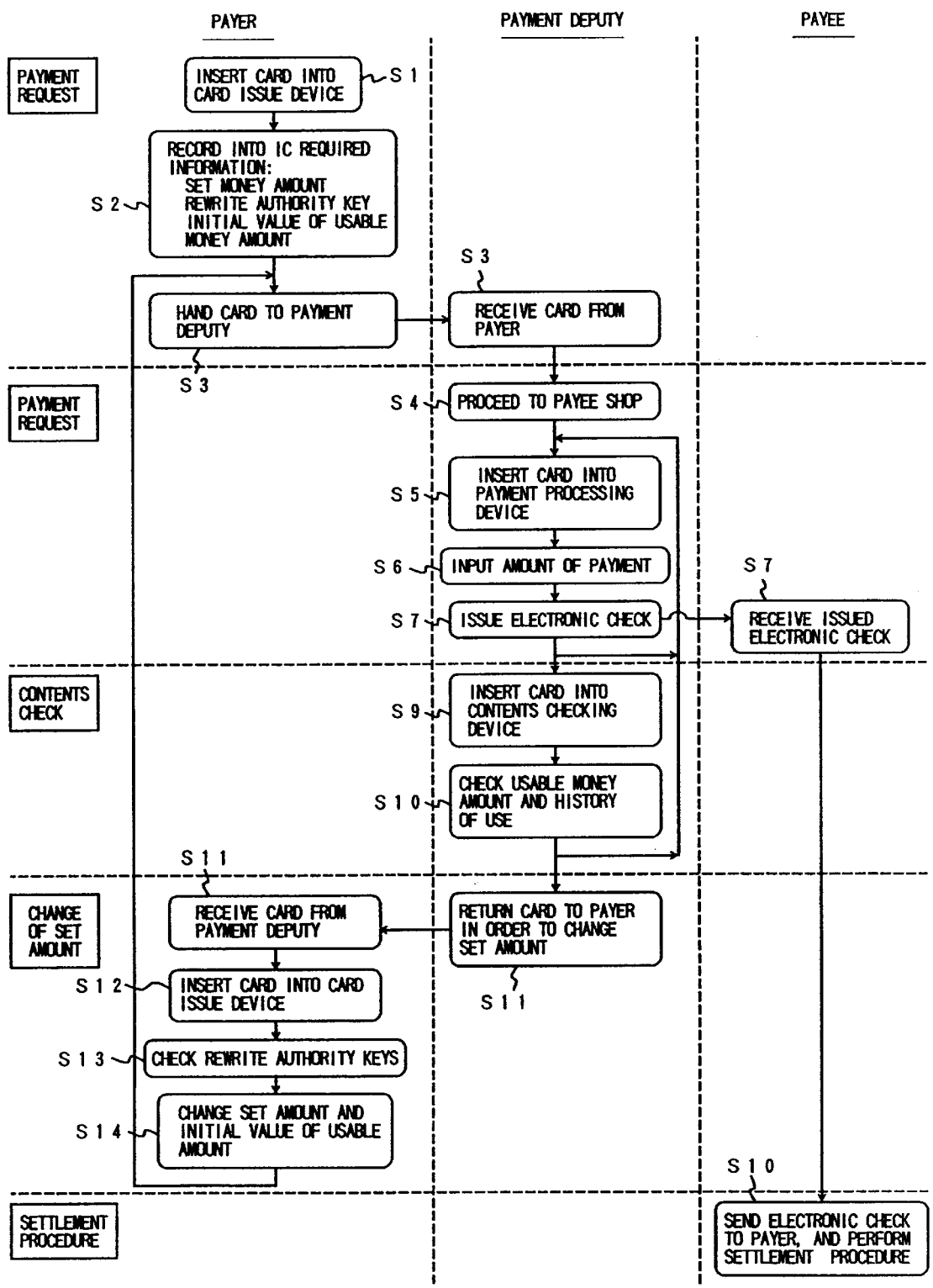
FIG. 29 is a flow chart showing a summary of the flow of the procedure for this system from the issue of a card up to the completion of payment.

FIG. 29 shows a summary of the flow of the procedure in this system from the issue of a card up to the completion of settlement of a check.

First, the payer inserts the card 301 into the card issue device 303 (S1), and certain required items are written from the card issue device 303 into the IC chip 311 of the card 301 (S2). Among these required items which are written here, there are at least three items—the set money amount, a rewrite authority key, and the initial value of the usable money amount. The set money amount denotes the upper limit value for the total of the face values of the electronic checks which can be issued from this card 301. The usable money amount denotes the upper limit value for the face value of a single electronic check which can be issued at the present time point, and as will be described hereinafter it diminishes by the issued amount each time an electronic check is issued. And the initial value of usable money amount is the initial value for the usable money amount which is set when the card is issued, and a suitable amount is set less than or equal to the set money amount. The rewrite authority key is a secret code known only to the payer, and as will be described hereinafter, as long as this secret code is not input, the IC chip 311 will not permit the rewriting of the set money amount. When the writing of these required items has been completed, the card 301 is ready to be issued as an electronic checkbook.

Next, this card 301 may be handed over to the payment deputy (S3). The payment deputy carries the card 301 about and proceeds to the shop of the payee (S4), and in compliance with the request for example purchases some goods. And he pays this purchase amount by an electronic check in the following manner. That is to say, first, he inserts the card

301 into the payment processing device 307 (S5), and next he inputs the amount for payment (the amount of the purchase) into the payment processing device 307 (S6). Next, a decision is made by the payment processing device 307 according to a procedure which will be explained in detail hereinafter as to whether or not it is possible to issue an electronic check for this payment amount, based upon the set money amount and the usable money amount which are recorded in the card 301, and upon the payment amount which has been input. If the result is that it is possible, then an electronic check for this payment amount is issued from the card 301 with respect to the payment processing device 307 (S7).

When this electronic check is received, the payment processing device 307 rewrites the usable money amount in the IC chip 311 to be the remaining amount of money by subtracting the payment amount from its original amount, and also writes an electronic check issue history including the shop code, the date of issue, the amount of payment, and the like upon the optical recording medium 303 of the card 301, and next ejects the card 301. Thereafter it is possible to perform settlement by cash (S8) by transmitting this received electronic check at a desired time from the payment processing device 307 to a processing device of the payer (or a settlement financial establishment).

Furthermore, after once a payment was performed by electronic check, the payment deputy can repeat the payment by electronic check using the card 301 continually, if necessary. In this case, the usable money amount recorded upon the card 301 is reduced every time the electronic check is issued, and when it becomes zero this card 301 can no longer be used as an electronic checkbook. The payment deputy can read out from the card 301 and check (S10) the current usable money amount and the history of use up to the present by inserting the card 301 into the contents checking device 305 (S9).

When the usable money amount is zero or the remainder has become too small, or a requirement has arisen to change the set money amount, or the like, according to requirements, the payment deputy can return the card 301 to the payer (S11). The payer inserts this card 301 into the card issue device 303 (S12), and inputs the rewrite authority key. When he does this, comparison is performed (S13) between the rewrite authority key which is input in the IC chip 311 of the card 301 and the initially registered one, and if they agree then the rewrite restriction for the set money amount is unlocked.

Next, according to requirements, the payer can freely increase or diminish by rewriting the value of the set money amount or of the initial value for the usable money amount (S14). When this rewriting has been completed, the card 301 comes to be reissued as an electronic checkbook with the new set value.

Figure 30:
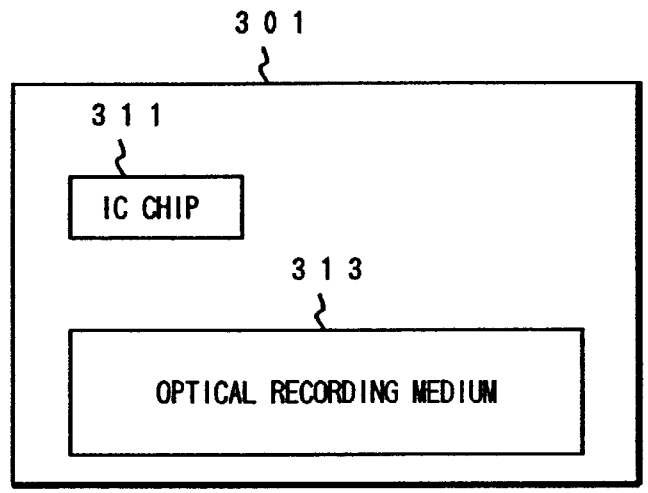
FIG. 30 is a plan view showing the overall construction of an IC/optical hybrid card which is used as an electronic checkbook.
Figure 31:
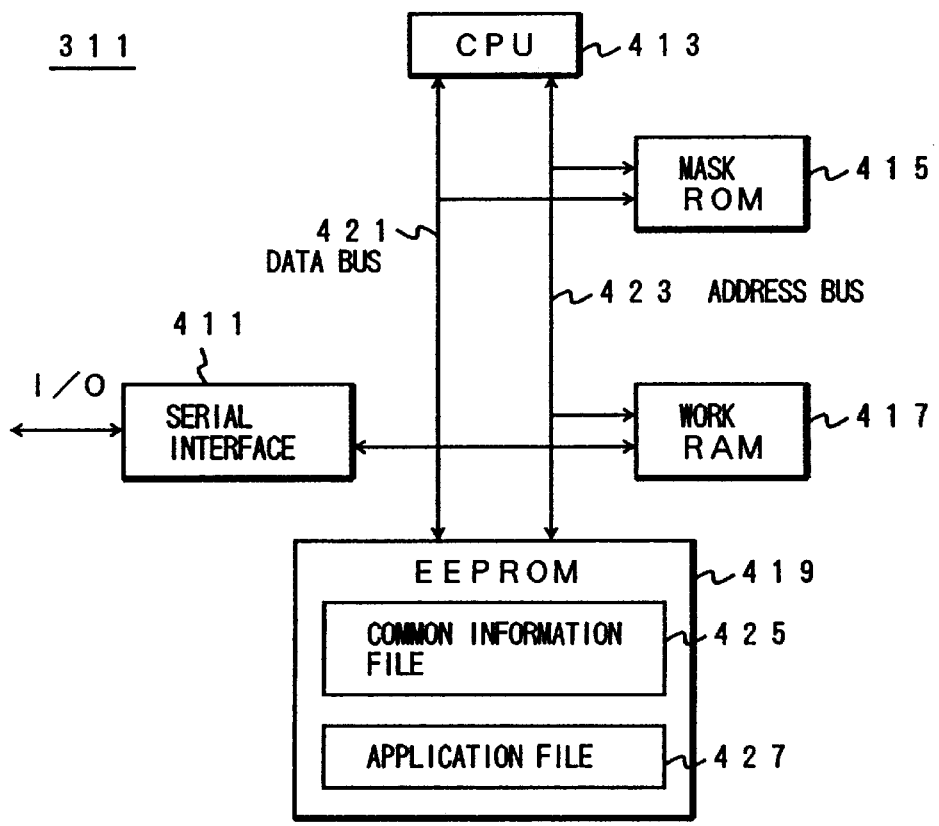
FIG. 31 is a block diagram showing the internal construction of an IC chip of the same card.

FIG. 30 shows the overall construction of a card 301 which is used as an electronic checkbook, and FIG. 31 shows the internal construction of an IC chip 311 thereof.

As shown in FIG. 30, an IC chip 311 and an optical recording medium 313 are provided on the face of this card 301. Since the optical recording medium 313 is of a type upon which information is recorded by digging minute holes or so called pits formed by a laser beam or the like, it cannot be rewritten, although it can freely be read out and added to. As described above, the history of issue of electronic checks, i.e. the shop codes and days of issue and amounts of money paid and the like are recorded upon this optical recording medium 313. The payer or the payment deputy can check whether or not the issue of the electronic check was correctly performed by reading out this issue history. In this case, there is no fear that falsification of such history as has become disadvantageous from the point of view of the payer will be performed, since rewriting is an impossibility.

As shown in FIG. 31, the IC chip 311 is a one chip type microcomputer including a serial interface 411, a CPU 413, a mask ROM 415, a work RAM 417, an EEPROM 419, a data bus 421, and an address bus 423. The serial interface 411 is an interface for the card issue device 303 and the contents checking device 305 and the payment processing device 307 (hereinafter termed "terminal devices").

The operating program for the CPU 413 is stored in the mask ROM 415. In this operating program there are included programs for performing access control when the terminal devices 303, 305, and 307 are being accessed to the EEPROM 419, a program for memory management, a program for checking procedures, and the like.

Further, the work RAM 417 is a work area for the CPU 413. A common information file 425 and an application file 427 are provided in the EEPROM 419. The common information for all the various applications which this card 301 can utilize is stored in the common information file 425, and, further, application specific information is stored in the application file 427. The service of issuing electronic checks is one of the various applications for which this card 301 can be used, and therefore the above described set money amount, rewrite authority key, and usable money amount and the like are recorded in an area for electronic check service within the application file 427.

Herein, very important is the security function of the IC chip 311. There is provided both a security function in terms of hardware and the one in terms of software.

As for the security function in terms of hardware, the IC chip 311 is made as a single chip, and it is arranged that the reading out of information from the EEPROM 419 and from the mask ROM 415 is impossible unless the CPU 413 is functioning normally. That is, if either an attempt is made to read out information to the outside directly from the memories 419 and 415 and not via the CPU 413, or even an attempt is made to rewrite this information, this is impossible.

As for the security function in terms of software, it is possible to impose various types of access restriction such as a reading out restriction or a rewrite restriction for specified areas in the EEPROM 419 and the mask ROM 415, in a manner so that this restriction absolutely cannot be lifted, or alternatively in a manner so that this restriction cannot be lifted unless a specified secret key is used.

In concrete terms, by imposing such a read out restriction, the program within the mask ROM 415, and the rewrite authority key within the EEPROM 419 absolutely cannot be read out from the IC chip 311. In other words, these items of information can only be used internally to the IC chip 311, and cannot be known to the outside. Further, by imposing a rewrite restriction upon the set money amount and upon the rewrite authority key within the EEPROM 419, these rewrite restrictions cannot be lifted as long as the same key is not input as the above described rewrite authority key. Further, by imposing a different rewrite restriction also upon the usable money amount which is renewed each time an electronic check is issued, it is not possible for the payment deputy to lift this rewrite restriction using the contents checking device 305.

By this sort of access restriction, the set money amount can only be rewritten by the payer, while it cannot be changed by the payment deputy or by the payee. Further, whenever as well the usable money amount is changed, the payment deputy cannot change it according to his own convenience. Yet further, since the history of the optical recording section 313 cannot be falsified, by comparing together this history and the set money amount and the usable money amount and so on, the accuracy of these data items can be checked, so that a yet further high security level is guaranteed.

In this manner, with the card 301, ingenious access restrictions are imposed in relation to the set money amount and the usable money amount. And when an electronic check is issued from this card 301, by performing processing as will be described hereinafter, the electronic check is issued safely in such a way that unexpected loss to the payer does not occur, and moreover from the point of view of the payment deputy the merit is obtained that the issue of an electronic check corresponding to the payment amount is possible.

Figure 32:
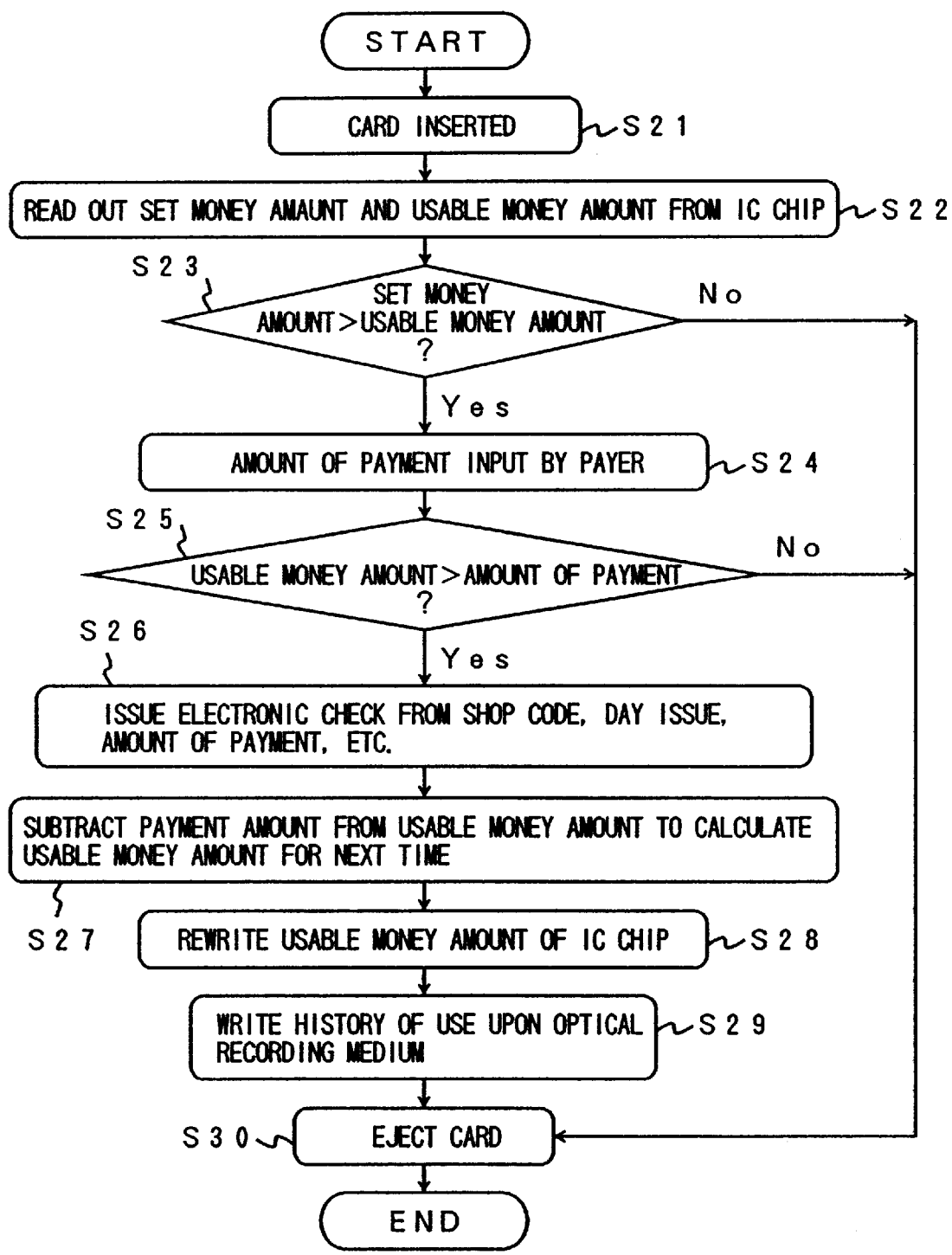
FIG. 32 is a flow chart showing the flow of the processing performed by a payment processing device when generating an electronic check.

FIG. 32 shows the flow of the processing performed by the payment processing device 307 when generating an electronic check.

When the card 301 is inserted (S21), the set money amount and the usable money amount (the first time, the initial value for the usable money amount) are read out from the IC chip 311 (S22). And, first, it is checked as to whether or not the usable money amount does not exceed the set money amount, and if it does exceed it then the card 301 is ejected as an error (S30).

If the usable money amount is less than or equal to the set money amount, then the amount for payment input by the payment deputy is received (S24), and this amount for payment and the usable money amount are compared (S25). If the result is that the amount for payment exceeds the usable money amount, then the card 301 is ejected as an error (S30).

On the other hand, if the amount for payment is less than or equal to the usable money amount, then it is decided that it will be acceptable to issue an electronic check, and an electronic check is issued including information such as the shop code, the date of issue, the amount for payment, etc. (S26).

Next, the amount of payment is subtracted from the usable money amount to calculate the usable money amount for next time (S27), and this usable money amount is rewritten into the IC chip 311 of the card 301 (S28). Next, the issue history is written cumulatively upon the optical recording medium 313 of the card (S28), and finally the card 301 is ejected.

According to the above processing, the face value of any single electronic check is always limited to being less than or equal to the usable money amount, and moreover the value of the sum of the face values of all of the electronic checks which can be issued is limited to being less than or equal to the set money amount. And the set money amount cannot be rewritten by any person other than the payer. Because of these features, the payer cannot suffer any loss which exceeds the set money amount, even if the card 301 has been used improperly. Furthermore, it is convenient from the point of view of the payment deputy, because without ever having cash a check of face value which matches the amount for payment can be issued, provided that the amount is within the range of the usable money amount.

Now, in the processing of FIG. 32, particularly for the steps S22, S23, S25, S27, and S28, by the IC chip 311 being informed of the amount for payment by the payment processing device 307, if it is so arranged that these steps are performed internally to the IC chip 311, since the set money amount and the usable money amount are no longer handled by the payment processing device 307, they come to be certainly only handled by the payer, and the level of safety is yet further elevated.

What is claimed is:

1. An electronic check system for issuing an electronic check of the form of electronic data, comprising:

an IC card having an IC chip in which are stored a set money amount and an usable money amount which must be lower than or equal to said set money amount, said usable money amount or defining an upper limit for a face value of a single electronic check which can be issued;

a card issue device for writing an initial value of said usable money amount in said IC chip of said IC card; and a payment processing device for inputting a payment amount thereinto and for, only if said payment amount input does not exceed said usable money amount stored in said IC card, accepting the issue of an electronic check having the face value of said payment amount from said IC card and for updating said usable money amount stored in said IC card by subtracting from said usable money amount said face value of said electronic check which has been issued;

wherein said IC chip of said IC card imposes a rewrite restriction with respect to said set money amount stored in said IC chip, and maintains said rewrite restriction unless a rewrite authority key which only a payer knows is used.

2. An electronic check system according to claim 1, wherein the IC chip imposes another rewrite restriction with respect to said usable money amount stored in said IC chip, and maintains said another rewrite restriction against devices other than said card issue device and than said payment processing device.

3. An electronic check system according to claim 1, wherein said IC card further having an auxiliary recording medium for unerasably storing an issue history including at least said face value of said electronic check which has been issued; and wherein said payment processing device, when accepting the issue of said electronic check, writes said issue history of said electronic check which has been issued into said auxiliary recording medium.

4. An IC card for functioning as a book of electronic checks in the form of electronic data, comprising:

an IC chip for storing a set money amount and an usable money amount which must be lower than or equal to said set money amount stored in said IC chip, said usable money amount for defining an upper limit for a face value of a single electronic check which can be issued;

wherein said IC chip imposes a rewrite restriction with respect to said set money amount stored in said IC chip, and maintain said rewrite restriction unless a rewrite authority key which only a payer knows is used; and said IC chip has a processor for comparing a payment amount with said usable money amount stored in said IC chip, for issuing an electronic check having the face value of said payment amount only if said payment amount does not exceed said usable money amount stored in said IC chip, and for updating said usable money amount stored in said IC chip by subtracting from said usable money amount said face value of said electronic check which has been issued.

5. A method for issuing an electronic check of the form of electronic data, comprising the steps of:

preparing an IC card that functions as a book of electronic checks, having an IC chip in which are stored a set money amount on which a rewrite restriction is imposed by said IC chip and an usable money amount for defining the upper limit for a face value of a single electronic check which can be issued;

comparing a payment money amount with said usable money amount stored in said IC chip;

issuing an electronic check having the face value of said payment money amount, only is said payment money amount does not exceed said usable money amount stored in said IC chip; and updating said usable money amount stored in said IC chip by subtracting from said usable money amount said face value of said electronic check which has been issued.

* * * * *